(12) United States Patent
Moondhra et al.

(10) Patent No.: US 11,640,352 B2
(45) Date of Patent: *May 2, 2023

(54) TESTING SOFTWARE AND/OR COMPUTING HARDWARE DESIGN THROUGH TEST FRAGMENTATION INTO ONE OR MORE DISCRETE COMPUTING ENVIRONMENTS

(71) Applicant: Methodics, Inc., San Francisco, CA (US)

(72) Inventors: Vishal Moondhra, San Jose, CA (US); Peter Theunis, Walnut Creek, CA (US)

(73) Assignee: Methodics, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/895,093

(22) Filed: Aug. 25, 2022

(65) Prior Publication Data

US 2022/0413998 A1    Dec. 29, 2022

Related U.S. Application Data

(63) Continuation of application No. 16/897,259, filed on Jun. 9, 2020, now Pat. No. 11,461,223.

(51) Int. Cl.
*G06F 11/36* (2006.01)
*G06F 16/11* (2019.01)
*G06F 9/50* (2006.01)

(52) U.S. Cl.
CPC ........ *G06F 11/3688* (2013.01); *G06F 9/5005* (2013.01); *G06F 11/3664* (2013.01); *G06F 11/3684* (2013.01); *G06F 11/3692* (2013.01); *G06F 16/125* (2019.01); *G06F 2209/5011* (2013.01)

(58) Field of Classification Search
None
See application file for complete search history.

(56) References Cited

U.S. PATENT DOCUMENTS

| | | | | |
|---|---|---|---|---|
| 8,966,021 B1 * | 2/2015 | Allen | .................. | G06F 9/45533 717/109 |
| 2003/0120700 A1 * | 6/2003 | Boudnik | ............. | G06F 11/3688 718/102 |

(Continued)

*Primary Examiner* — Andrew M. Lyons
(74) *Attorney, Agent, or Firm* — Peter Jensen-Haxel

(57) ABSTRACT

Disclosed is a method, a device, a system and/or a manufacture of testing software and/or computing hardware design through test fragmentation into one or more discrete computing environments. In one embodiment a method for efficient testing with a test fileset includes initiating a new instance of an operation filesystem and copying a software application, a script, a computer hardware design, and/or a circuit design to be tested into the operation filesystem to define a workspace data. The method defines a discrete environment that is a computing container and/or a virtual computer, the assigns the discrete environment a processing power and/or memory allocation from a computing resources pool and clones a workspace master to generate a workspace clone. The method then extracts a test script from the test fileset, executes the test script within the workspace clone, and returns the resources to the computing resources pool.

20 Claims, 20 Drawing Sheets

(56) References Cited

U.S. PATENT DOCUMENTS

| | | | |
|---|---|---|---|
| 2011/0239214 A1* | 9/2011 | Frields | G06F 11/3672 718/1 |
| 2013/0055206 A1* | 2/2013 | Dudek | G06F 11/366 717/124 |
| 2014/0279908 A1* | 9/2014 | Manfe | G06F 16/10 707/639 |
| 2014/0282434 A1* | 9/2014 | Eilam | G06F 11/3688 717/124 |
| 2015/0120791 A1* | 4/2015 | Gummaraju | G06F 9/45558 707/823 |
| 2019/0034320 A1* | 1/2019 | Stokes | G06F 11/3692 |

* cited by examiner

TEST INITIATION
PROCESS FLOW 1050

FIG. 11  MASTER WORKSPACE ASSEMBLY PROCESS FLOW 1150

TEST FRACTIONATION PROCESS FLOW 1250

*FIG. 13*  COMPUTING RESOURCE ALLOCATION PROCESS FLOW 1350

*FIG. 14*  WORKSPACE DISSOCIATION PROCESS FLOW 1450

*FIG. 15*   DISSOCIATED EXECUTION PROCESS FLOW 1550

FIG. 16 TEST RECORDATION AND REPORT GENERATION PROCESS FLOW 1650

AUDIT RETENTION PROCESS FLOW 1750

FIG. 18    TEST RECREATION CERTIFICATION PROCESS FLOW 1850

*FIG. 19*  TEST ISOLATION CERTIFICATION PROCESS FLOW 1950

BLOCKCHAIN STORAGE PROCESS FLOW 2050

TESTING SOFTWARE AND/OR COMPUTING HARDWARE DESIGN THROUGH TEST FRAGMENTATION INTO ONE OR MORE DISCRETE COMPUTING ENVIRONMENTS

FIELD OF TECHNOLOGY

This disclosure relates generally to data processing devices and, more particularly, to a method, a device, and/or a system of testing software and/or computing hardware design through test fragmentation into one or more discrete computing environments.

BACKGROUND

Software and computing hardware can be complex, related to many other systems or parts of a larger system, and/or can exhibit unpredictable outcomes. Testing can be an important part of the software and computing hardware development, use, and improvement. A software or computing hardware developer (e.g., in individual, a development team, an enterprise) may test with real and/or simulated environments.

Software and hardware design may range from relatively small components, including one or a few files, to large components, including many files. For example, a software application might be a microservice having a single file that stores only a few lines of software code. A relatively large software application or hardware design, in contrast, may have thousands of lines of code, or may be comprised of thousands of files.

It may be difficult to test the software or hardware design efficiently, accurately, and/or cost effectively. One example of the development testing process will be described. The developer may initiate testing on a computing device such as a laptop computer, workstation computer, and/or server computer. First, the developer may have to download the software or hardware design, which may be large, to the computing device. Once downloaded, the testing may require that several tests are performed, each comprised of a test sub-component that may be a test script. This process may be manual and possibly slow or prone to user error. The testing may also occur within a singular runtime environment. As a result of this testing process, there is a possibility that tests may interfere. In some cases, the user may try to manually "reset" the environment before execution of each test script to avoid such interference, a process which itself may be prone to user error or oversight. The testing process therefore may not only be inefficient but may also be prone to oversights, false positives, and/or false negatives.

As a result of these challenges, an enterprise may expend significant human resources and monetary resources for testing. Talented and expensive developers may waste time testing while still having a relatively high possibility of making mistakes. Development cycles may be slower, lowering an enterprise's competitive advantage and revenue. Inefficiencies in testing may reduce the number of testing iterations and/or practically limit the number of simulated environments that can be tested, increasing a risk of degraded performance and/or error. There is continuing need for efficient, fast, and/or accurate technologies for software and hardware design testing.

SUMMARY

Disclosed are a method, a device, and/or a system of testing software and/or computing hardware design through test fragmentation into one or more discrete computing environments. In one embodiment, a method for software and computing hardware design testing includes selecting a test fileset including one or more test scripts, and selecting a filesystem root of a substrate filesystem to be operated on by at least one of the one or more test scripts. The method initiates a new instance of an operation filesystem to operate from, clones the substrate filesystem to be operated on to generate a substrate filesystem clone, and copies a software application, a script, a computer hardware design, and/or a circuit design to be tested into the operation filesystem to define a workspace data. A workspace master is defined, and a discrete environment that is a computing container and/or a virtual computer is initiated. The method clones the workspace master to generate a workspace clone, mounts the workspace clone to the discrete environment, and associates the workspace clone with the substrate filesystem clone. A test script from the one or more test scripts is executed to write to the workspace clone.

The method may assign the discrete environment a processing power allocation and a memory allocation from a computing resources pool. A result data that is output from execution of the test script may be evaluated, a test passage determined, and a tear-down instruction issued for the discrete environment. The processing power allocation and the memory allocation may be returned to the computing resources pool. The substrate filesystem clone may be designated for deletion.

The method may also evaluate the result data that is output from execution of the test script, determine a test failure, and designate the substrate filesystem and/or the substrate filesystem clone for storage retention in a computer memory. The substrate filesystem clone may be modified through one or more computer executable instructions of the test script. A test report may be generated that includes the result data. The test report may be returned to a computing device of a user.

The method may initiate a second instance of the discrete environment, and re-assign at least a portion of the processing power allocation and/or the memory allocation from the computing resources pool to the second instance of the discrete environment.

The method may also clone the workspace master to generate a second instance of the workspace clone, clone the substrate filesystem to generate a second instance of the substrate filesystem clone, and mount the second instance of the workspace clone to the second instance of the discrete environment. The second instance of the substrate filesystem clone may be associated to the workspace clone.

The method may then select, from the one or more test scripts of the test fileset copied into the workspace data and cloned into the second instance of the workspace clone, a second instance of the test script that is different from a first instance of the test script. The second instance of the test script then may be executed.

The method may authenticate the user and/or the computing device of the user. A test session may be initiated and a session identifier assigned to the test session. The method may then verify a unique identifier of the user is associated with a read permission of the software application, the script, the computer hardware design, the circuit design, the test fileset, and/or the substrate filesystem. The method may, alternatively or in addition, verify a unique identifier of the user is associated with a read permission of a design component of a design dependency graph associated with the software application, the script, the computer hardware design, and/or the circuit design. The session identifier may be assigned to the result data and/or the test report. The result data and/or the test report may be returned to the computing device of the user.

The method may copy the software application, the script, the computer hardware design, and/or the circuit design into the operation filesystem. The workspace master may be read-only protected, and a runtime environment data of a runtime environment of the discrete environment may be stored. The method may define a database relation associating the software application, the script, the computer hardware design, and/or the circuit design and the runtime environment data. A database relation may be defined to associate the result data and the software application, the script, the computer hardware design, and/or the circuit design. Similarly, a database relation may be defined to associate the test report and the software application, the script, the computer hardware design, and/or the circuit design.

In another embodiment, a method for efficient testing with a test fileset includes initiating a new instance of an operation filesystem to operate from and copying a software application, a script, a computer hardware design, and/or a circuit design to be tested into the operation filesystem to define a workspace data. A workspace master is defined, along with a discrete environment that is a computing container and/or a virtual computer. The method assigns the discrete environment a processing power allocation and a memory allocation from a computing resources pool and clones the workspace master to generate a workspace clone.

The method then extracts a test script from the test fileset, executes the test script within the workspace clone, and returns the processing power allocation and/or the memory allocation to the computing resources pool.

In yet another embodiment, a system for testing computing hardware designs and software includes a test orchestration server and a network. The test orchestration server includes a processor of the test orchestration server, a memory of the test orchestration server, a test processing agent, a test fractionation routine, an environment manager, a cloning engine, and a test isolation engine. The test processing agent includes computer readable instructions that when executed on the processor of the test orchestration server issue an assembly instruction to assemble a workspace master that includes a software application, a script, a computer hardware design, and/or a circuit design to be tested. The test fractionation routine includes computer readable instructions that when executed on the processor of the test orchestration server extract a test script from a test fileset including one or more test scripts.

The environment manager includes computer readable instructions that when executed on the processor of the test orchestration server issue an environment initiation instruction to initiate a discrete environment that is a computing container and/or a virtual computer. The cloning engine includes computer readable instructions that when executed on the processor of the test orchestration server issues a cloning instruction to clone the workspace master to generate a workspace clone. The test isolation engine including computer readable instructions that when executed on the processor of the test orchestration server issue an environment execution instruction to execute the test script within the discrete environment. The system may further including a dissociated test server, a workspace assembly server, a design server, a root filesystem server, and/or a test storage server.

BRIEF DESCRIPTION OF THE DRAWINGS

The embodiments of this disclosure are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Disclosed are a method, a device, and/or system of testing software and/or computing hardware design through test fragmentation into one or more discrete computing environments. Although the present embodiments have been described with reference to specific example embodiments, it will be evident that various modifications and changes may be made to these embodiments without departing from the broader spirit and scope of the various embodiments.

Figure 1:
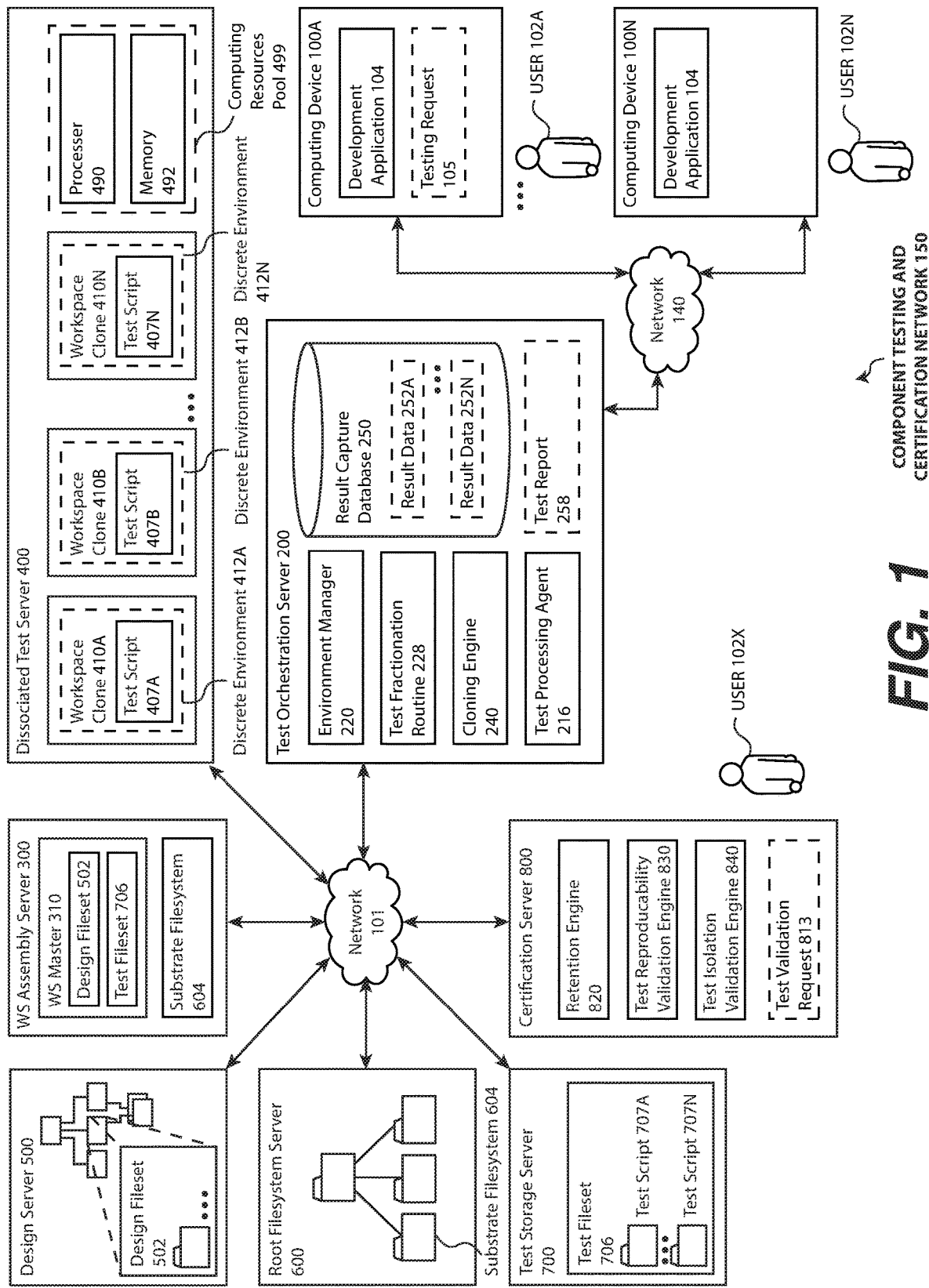
FIG. 1 illustrates a component testing and/or certification network comprising a computing device of a developer, a test orchestration server, a workspace assembly server, a dissociated test server, a design server, a root filesystem server, a test storage server, a certification server, and a network, according to one or more embodiments.

FIG. 1 illustrates a component testing and certification network 150, according to one or more embodiments. In one or more embodiments, the component testing and certification network 150 may be utilized to perform what may be an efficient, accurate, and/or reproducible testing of a component such as software, a script, a network configuration, an application, an artificial neural network, computing hardware (including without limitation computer processor and CPU design), circuit design, and/or integrated circuit design. A computing device 100 may select a design version 504 to be tested, a workspace assembly server 300 may assemble a workspace master 310 from the design fileset 502 of the design version 504, a test orchestration server 200 may fractionate the test fileset 706 and orchestrate creation of discrete environments 412, each assigned one or a limited number of test scripts 707 and which may execute on a dissociated test server 400 utilizing a computing resources pool 499 (e.g. via cloud computing infrastructure), with results of the testing stored in a result capture database 250 and optionally built into a test report 258 to be returned to the computing device 100 for analysis by a user 102.

In the embodiment of FIG. 1, the user 102 (e.g., a computer programmer, a software architect, a software engineer, a hardware engineer) may design, review, or otherwise work with the component using a development application 104 on the computing device 100. The development application 104 may comprise computer readable instructions that when executed may include functions that include displaying the design version 504, navigating the design dependency graph 554, and/or generating the testing request 105. In the embodiment of FIG. 1, a user 102 is associated with each instance of the computing device 100, e.g., the user 102A is associated with and utilizes the computing device 100A (except for the exemplary instance of the user 102X, who is described below). Specifically, the user 102 may work with a design fileset 502 of the component. A component and/or a design fileset 502 may be generally, but not always, tracked by version. The design version 504 can both be referred to as the design version 504 "of the component" and the design version 504 "of the design fileset." The design version 504 is shown and referred to as the design version 504, and the component is shown and referred as the component 552. As shown in FIG. 1, there may be multiple instances of the computing device 100 within the component testing and certification network 150. The computing device 100 may generate a testing request 105 for testing of a design version 504, for example at the initiation of the user 102 following modification of the design version 504. The testing request 105 selects the component 552, the design version 504, and/or the design fileset 502 for testing, and may include other specified data such as the testing to be performed, a runtime environment and/or testing environment in which to run the test, and/or other testing parameters.

The testing request 105 may be transmitted through the network 140 to the test orchestration server 200. The network 140 may be a local area network (LAN), a wide area network (WAN), a virtual private network (VPN), the internet, and/or other networks sufficient to communicatively couple each of the computers, devices, servers, and other elements of FIG. 1. The testing request 105 may include a selection of the design version 504 of the design fileset 502 (e.g., specified through a unique identifier of the design version 504), and a selection of a test version 708 of a test fileset 706 (e.g., specified through a unique identifier of the test fileset 706). It should be noted that within the present embodiments, any of the UIDs of an element referred to herein and in the accompanying claims (e.g., the user UID 101, the design version UID 501, the component UID 551, the test UID 801, etc.) may also be referred to as "a unique identifier" of such element.

The test orchestration server 200 is a computing server that may orchestrate testing of the component and engage in additional related functions. In the embodiment of FIG. 1, the test orchestration server 200 may receive and processes the testing request 105 utilizing the test processing agent 216. The test orchestration server 200 may authenticate the user 102 and/or authorize the user 102 to access the design fileset 502, the test fileset 706, and/or the substrate filesystem 604. As shown and described in one or more of the embodiments, the test orchestration server 200 may issue instructions to assemble a workspace data and/or a workspace master 310. The test orchestration server 200 may also control discrete environments 412, as described below.

The workspace assembly server 300 (abbreviated 'WS assembly server 300' in the embodiment of FIG. 1) may build a workspace master 310 comprising the design fileset 502 and the test fileset 706, and may also define a substrate filesystem 604 as a master filesystem. The workspace assembly server 300 may copy the design fileset 502, the test fileset 706, and the substrate filesystem 604 from a design server 500, a root filesystem server 600, and/or a test storage server 700, respectively. Alternatively or in addition, the workspace assembly server 300 may mount, lock, and/or read-only protect the design fileset 502, the test fileset 706, and/or the substrate filesystem 604 in their respective storage locations. In one or more embodiments, the design server 500, the root filesystem server 600, and/or the test storage server 700 may be implemented as network attached storage (NAS) and accessible through protocols such as NFS, iSCSI, SMB, CIFS, and/or SAN.

The test orchestration server 200 may fractionate the test fileset 706 into one or more test scripts 707 by utilizing a test fractionation routine 228. Each of the fractionated test scripts 707 may be queued. The environment manager 220 may initiate or 'spin up' one or more discrete environments 412 (e.g., a discrete environment 412A through a discrete environment 412N), including by issuing an environment initiation instruction (e.g., the environment initiation instruction 223). For example, each discrete environment 412 may be a computing container (e.g., Docker® shell), a virtual computer (e.g., VMWare® virtualization hypervisor), and/or another isolated computing environment. Containerization may also be utilized on top of virtualization, for example a hypervisor utilized to spawn containers. The initiation and/or instruction to initiate may include instructions for the allocation of a processing power and a computing memory for a computing resources pool 499, instructions cloning the workspace master 310, and/or instructions for taking an action in response to the output to return data and/or tear down the discrete environment 412.

Figure 4:
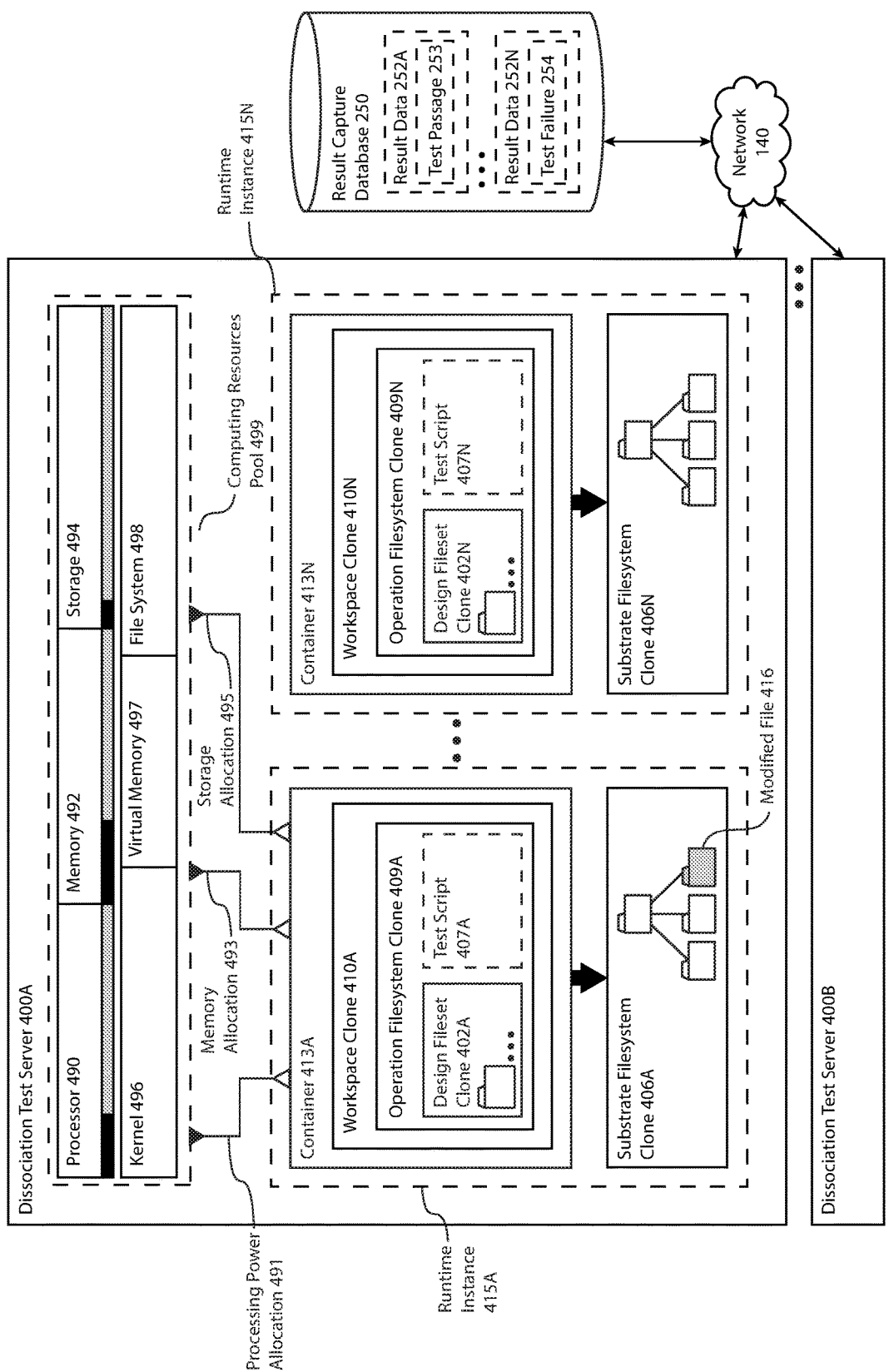
FIG. 4 illustrates one or more instances of a dissociated test server of FIG. 1 comprising one or more discrete environments each storing a workspace clone and/or a substrate filesystem clone, the one or more discrete environments each storing a test script, and the dissociated test server, including a computing resources pool allocated to each discrete environment to enable independent execution of each test script, according to one or more embodiments.

In one or more embodiments, the test orchestration server 200 may copy the workspace master 310 into each discrete environment 412 for testing. However, in one or more preferred embodiments, a cloning engine 240 may clone, rather than copy, the workspace master 310 and/or the substrate filesystem 604 into each discrete environment 412. The cloning may be completed through a copy-on-write data structure, as shown and described throughout the present embodiments. Each test script 707 of the test fileset 706 may be assigned to one instance of the discrete environment 412, for example such that the discrete environment 412A includes the workspace clone 410A assigned the test script 707A. As shown in the embodiment of FIG. 4, the discrete environment 412A may also mount a substrate filesystem clone 406A that may be reserved for modifications effected by the test script 407A.

The design fileset 502 may, depending on the type of design or technology, comprise one or more sub-components that may be referred to as design dependencies, or simply "dependencies" of the component. The design dependencies may be stored, according to one or more embodiments, in a design dependency graph data structure that may model a dependency hierarchy, as further shown and described in conjunction with FIG. 7, FIG. 9, and elsewhere in the present embodiments.

The discrete environments 412 may be spun up on a dissociated test server 400 with the computing resources pool 499, potentially providing high speed parallel processing for execution of each test script 707. For example, the dissociated test server 400 may be implemented on a private enterprise server such as may be located in a data center controlled by the enterprise, through a public cloud computing platform (e.g., Amazon® Web Services, Microsoft® Azure), and/or utilizing a hybrid private-public cloud infrastructure. The dissociated test server 400 executes each instance of the test script 707 assigned to each workspace clone 410 within each discrete environment 412. The executing instance of the test script 407 may also modify the substrate filesystem clone 406 as part of the testing, as shown and described in conjunction with FIG. 4. Instances of the discrete environment 412 may be spun up and the corresponding test script 707 executed in parallel, e.g., each discrete environment 412 assigned to a distinct processing core of a processor 490 and/or allocated time on the processor 490, according to the available resources of the computing resources pool 499. In a specific example, one thousand test scripts 707 may be included within the test fileset 706 and may be queued (e.g., in the test queue 231 of FIG. 2). In such an example, the computing resources pool 499 may execute about fifty test scripts in parallel at any given time until all one-thousand instances of the test scripts 707 within the test fileset 706 have been executed. The test script 707 may be queued according to expected execution time, by file size, or other factors. Throughout the present embodiments, the test script 407 may refer to a cloned instance of the test script 707.

The execution of each test script 707 within each instance of the discrete environment 412 may result in generation of a result data 252. The result data 252 may be raw data and/or log files output by the test script 707, and/or otherwise related to the outcome of execution of the test script 707. Each instance of the result data 252 may be communicated over the network 140 for temporary and/or permanent storage in the result capture database 250. As shown in the embodiment of FIG. 1, 'N' instances of the discrete environment 412 (e.g, the discrete environment 412A through the discrete environment 412N) may generate 'N' instances of the result data 252 (e.g., the result data 252A through the result data 252N). Each discrete environment 412 (e.g., the discrete environment 412A), according to one or more embodiments, executes one or a limited number of instances of the test script 707 (e.g., the test script 707A), and such isolation does not affect other instances of the discrete environment 412 (e.g., the discrete environment 412B). Similarly, any modifications to the substrate filesystem clone 406A and the substrate filesystem clone 406B may be independent. In one or more embodiments, the fractionation of the test fileset 706 and the discrete testing of each test script 707 shown and described herein may be referred to as an isolation testing.

Each discrete environment 412 may be separately terminated, 'spun down', and/or 'torn down' after execution of the test script 707 and/or output of the result data 252. In one or more embodiments, an automatic tear-down may be based on an evaluation of the result data 252. In one or more embodiments, the discrete environment 412 is torn down when the test script 707 assigned to the discrete environment 412 may be determined to have resulted in a test passage (e.g., the test passage 253 of FIG. 2). A terminated discrete environment 412 may have previously allocated computing resources returned to the computing resources pool 499, which may make the computing resources available for re-allocation. The returned resources may then be re-assigned, for example resulting in additional instances of the test script 707 being extracted from the queue (e.g., the test queue 231 of FIG. 2) and assigned to newly initiated instances of the discrete environment 412.

Figure 2:
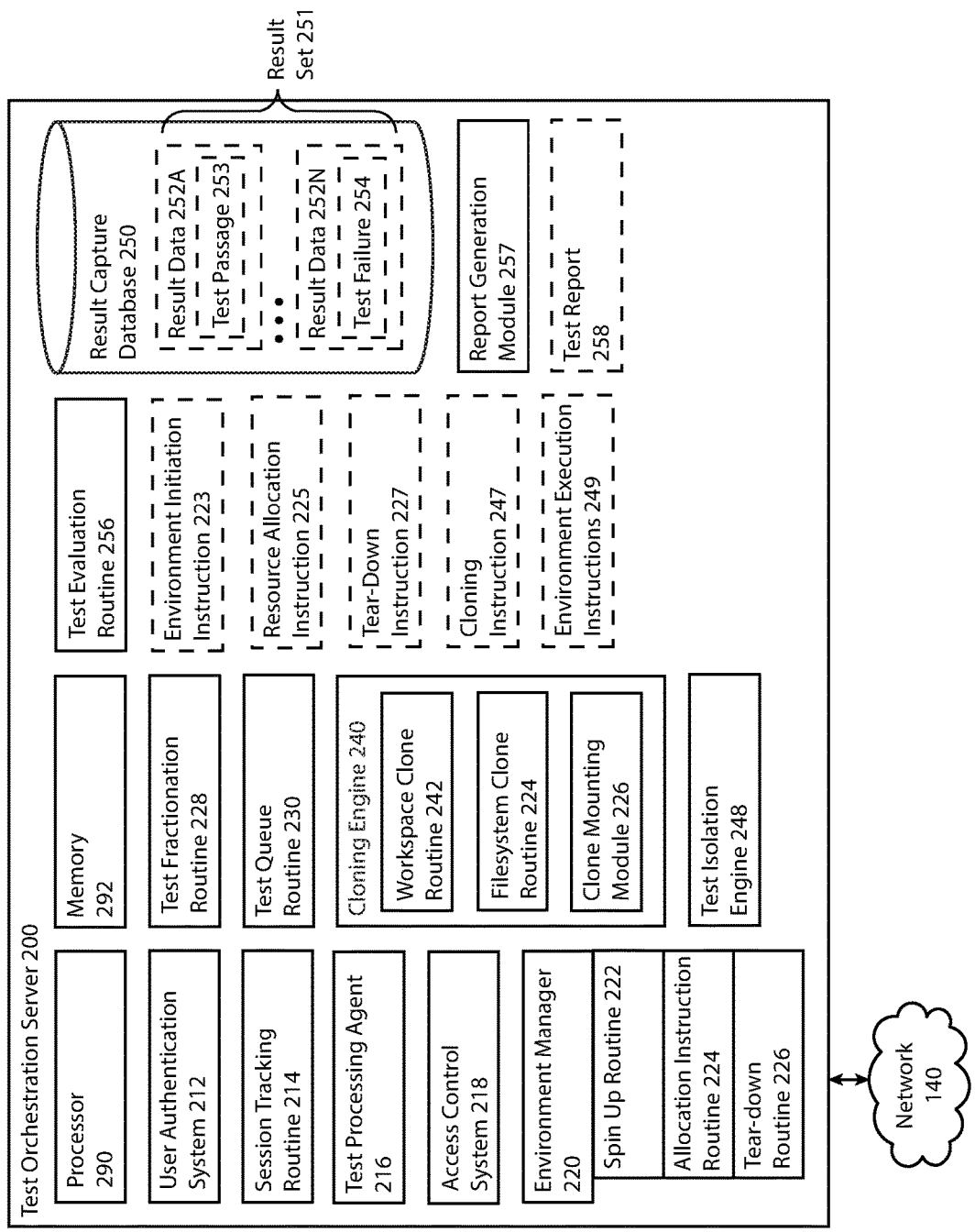
FIG. 2 illustrates the test orchestration server of FIG. 1 which may orchestrate dissociated testing of a design version of a component, the test orchestration server including a test processing agent, an environment manager, a test fractionation routine, a test isolation routine, a cloning engine, and a result capture database storing a result set comprising one or more instances of a result data that may be associated with a test passage or a test failure, according to one or more embodiments.

In one or more embodiments, data related to the testing is retained upon determination of a test failure (e.g., the test failure 254 of FIG. 2). For example, once utilized in a testing, the design version 504 and/or the design fileset 502 may become read-only in storage (e.g., within the design server 500 and/or the test storage server 700). Retention of data related to the testing may be initiated by one or more of the servers of FIG. 1, including initiation by the retention engine 820 of the certification server 800. The design version 504 and/or the design fileset 502 may be associated with the test version 708 and/or a test fileset 706 within a database. The runtime environment may be stored as a runtime environment data (e.g., the runtime environment data 823 of FIG. 8), for example storing information such as an operating system version of the discrete environment 412, versions and names of all applications (e.g., the kernel, a programming language such as Python interpreter or Golang, compilers), tools (e.g., simulators such as vsim, system tools), and/or code libraries (e.g., system libraries, libc, libopenssl, libz). If the substrate filesystem clone 406 has been modified by the testing, the substrate filesystem clone 406 may be retained. Retention of the substrate filesystem clone 406 may also implicate storage of the substrate filesystem 604 that was cloned, and/or promoting the substrate filesystem clone 406 using data of the substrate filesystem 604 to define what may be a complete copy of the substrate filesystem 604 as modified by the execution of the test script 407. The retention and/or restriction on deletion of such data may assist in troubleshooting, documentation, bug-fixes, auditing, and compliance. Some or all of the retained data may also be stored in an immutable data structure such as a blockchain data structure for auditing purposes and/or to prevent tampering. Embodiments related to data retention are further shown and described in conjunction with the embodiments of FIG. 8, FIG. 9, FIG. 17, and FIG. 20.

Upon execution of each of the test script 707A through the test script 707N of the test fileset 706, the set of the result data 252A through the result data 252N may be utilized to generate a test report 258, which may be data primarily formatted for human readability and optionally provide metanalysis or statistical analysis. The test report 258 may be returned to the user over the network 140.

In one or more embodiments, the certification server 800 may be utilized for auditing test records, retained data, and/or validating previous testing. A user 102X, who may be distinct from the one or more users originally initiating testing (e.g., the user 100A), may interface with the certification server 800 on a computer and to initiate a validation request 813. A reproducibility validation engine 830 may, in response to the validation request 813, query a testing history. The reproducibility validation engine 830 may then reconstruct a previous testing (or portions of the previous testing) by extracting, for example from a test record 851, the runtime environment data 823, design fileset 502, the substrate filesystem 604, the test fileset 706, instances of the test script 707, and/or any other stored data required to re-create the conditions of the previous testing. Result data 252 of the reproduction testing may be compared to previously stored instances to the result data 252 and/or the test report 258 of the previous testing to ensure accuracy and reproducibility of the testing.

The certification server 800 may also include an isolation validation engine 840. The isolation validation engine 840 may be utilized to validate that the design fileset 502 and/or each component, design, or file on which the design fileset 502 may depend has undergone the isolation testing, including through evaluation of retained testing records (e.g., the test record 851).

In one or more embodiments, the component testing and certification network 150 may be a multi-tenant system that may enable multiple users and/or computing devices 100 (e.g., the computing device 100A through the computing device 100N) to concurrently initiate and run tests on the same or separate instances of the component 552, the design version 504, and/or the design fileset 502. In such case, the testing, operation of discrete environments 412, and/or the result data 252 may be tracked by user UID (e.g., a user UID 101) and/or a session identifier. Each user may be assigned dedicated resources from the computing resources pool 499 and/or have dynamic assignment of resources from the computing resources pool 499 based on submitted testing requests 105. An embodiment in which the component testing and certification network 150 is multi-tenant may enable efficient sharing of the computing resources pool 499, and in general may permit faster results than dedicated allocation of individual computing resources which may otherwise be idle between tests.

FIG. 2 illustrates the test orchestration server 200 of FIG. 1, according to one or more embodiments. The test orchestration server 200 includes a processor 290 that is a computer processor and a memory 292 that is a computer memory. The test orchestration server 200 is communicatively coupled to the network 140. An authentication system 212 may be utilized to authenticate the user 102 and/or the computing device 100. The authentication system 212 may comprise computer readable instructions that when executed on the processor 290 of the test orchestration server 200 authenticates the user 102 generating the testing request 105 and/or a computing device 100 of the user 102. The authentication system 212 may make a remote procedure call to one or more other systems to effect the authentication, and may utilize multiple authentications factors (e.g., 2FA, 3FA) such as a password, physical device (e.g., a fob, a smartphone), and/or a biometric.

A session tracking routine 214 may implement a method for segregating and tracking testing requests 105 and result data 252, e.g., within a test session. The session tracking routine 214 may include computer readable instructions that when executed on the processor 290 of the test orchestration server 200 initiates a test session and assigns a session identifier to the unique identifier of the user (e.g., the user UID 101). The test session may be defined by the processing, execution, and delivery of results associated with a single instance (or multiple related instances) of the testing request 105. The session tracking routine 214 may also associate the session identifier with the result data 252, the test report 258, the discrete environment 412, and other data such that the testing can be properly documented to have been initiated by the user and the result data 252 and/or test report 258 was delivered to the user. In one or more embodiments, the user UID 101 may be used as a session identifier in association with the authentication system 212 to track submissions of the user.

A test processing agent 216 may listen for, receive, and process the testing requests 105. The testing request 105 may be received from the computing device 100 and/or the development application 104. The test processing agent 216 may include computer readable instructions that when executed on the processor 290 of the test orchestration server 200 receives and processes a testing request 105. The testing request 105 may include a selection of the design version 504 of the design fileset 502 and a selection of the test version 708 of the test fileset 706. For example, the testing request 105 may include a design version UID 501 of the design version 504, a UID 701 of the test version 708, the user UID 101 of the user 102 (and/or another type of session identifier), testing parameters (e.g., options for retention of data in the event of a test failure 254), a unique identifier of a substrate filesystem 604 to be operated on by the testing (e.g., a filesystem UID 601), and/or other data. The test processing agent 216 may issue an assembly instruction to assemble a workspace data for testing and/or a workspace master 310 on which to base the isolation testing, for example though a remote procedure call to the workspace assembly server 300 over the network 140.

An access control system 218 may verify that the user 102 and/or the computing device 100 of the user 102 is authorized to access and/or utilize data identified in, or is required to be responsive to, the testing request 105. For example, the access control system 218 may verify a user UID 101 of a user 102 is associated with a read permission of the design version 504 of the design fileset 502, the test fileset 706, the substrate filesystem 604, and a design component 552 of the design dependency graph 554 associated with the design version 504 of the design fileset 502. The access control system 218 may use a permission table to determine that the user 102 is permitted to access the component 752, the design version 504, the design fileset 502, individual instances of the design file 503 of the design fileset 502, the test version 708, the test fileset 706, and/or individual instances of the test script 707.

An environment manager 220 can be utilized to manage one or more discrete environments 412 for testing, including issuing the instructions for creation, operation, and termination of each instance of the discrete environment 412. The environment manager 220 may include a number of sub-elements such as a spin up routine 222, an allocation instruction routine 224, and a tear down routine 226. The spin up routine 222 may include computer readable instructions that when executed on the processor 290 of the test orchestration server 200 issue an environment initiation instruction 223 to initiate the discrete environment 412. For example, where the discrete environment 412 is a computing container, the initiation instruction will be an instruction to create and provision the computing container. Where the discrete environment 412 is a virtual computer, the initiation instruction may include an API call to the hypervisor layer (e.g., similar to "vzctl start" command in a command line interface). The allocation instruction routine 224 includes computer readable instructions that when executed issue a resource allocation instruction 225 that assigns the discrete environment 412 a processing power allocation (processing power allocation 491) and an allocation of computing memory (e.g., the memory allocation 493) from a computing resources pool 499. The tear down routine 226 includes computer readable instructions that when executed issue a tear-down instruction for the discrete environment 412 upon determination of a test passage 253.

The resource allocation instruction 225, the cloning instruction 247, and the tear-down instruction 227 may be issued separately and/or sequentially, or may be included within the environment initiation instruction 223. For example, the environment initiation instruction 223 may include the allocation instruction (e.g., the amount of computing power and memory that are to be allocated to the discrete environment 412), the conditions under which the discrete environment should be terminated (and what data, if any, should be retained), which instance of the workspace master 310 should be cloned into the discrete environment 412, and which instance of the substrate filesystem 604 should be cloned and mounted.

A test fractionation routine 228 parses and separates the test fileset 706, including computer readable instructions that when executed extract a test script 707 from the one or more test scripts 707 that comprise the test fileset 706 copied into a workspace master 310. Each instance of the test script 707 may be a discrete and/or logically distinct test to be performed on the design fileset 502. The test fractionation routine 228 may also identify a test script 707 through another method suitable for identifying discrete tests such as code markup and/or inexecutable comments within a software code file, or through other systems and methods as may be known in the art. Once identified and extracted, a test queue routine 230 may queue within a test queue 231 (e.g., store in sequence) one or more test scripts 707 for subsequent execution in the discrete environment 412, including tracking each test script 707 according to user, job, and/or session. The test queue 231 may be stored in the memory 292, and queued test scripts 707 may be stored sequentially and processed on a first-in-first-out basis. The test queue routine 230 may include computer readable instructions that when executed on the processor 290 of the test orchestration server 200 stores each of the one or more test scripts 707 in the test queue 231. The test script 707 may also be reorganized and stored in an arbitrary sequence to increase system performance and testing speed (e.g., fastest test first which may permit freeing up computing resources where over-provisioning of computing resources occurs due to template use).

The test orchestration server 200 may include a cloning engine 240 that may be utilized to clone the workspace master 310 and/or the substrate filesystem 604 into one or more instances of the discrete environment 412. In one or more embodiments, the cloning engine 240 may include a workspace clone routine 222, a filesystem clone routine 244, and a clone mounting module 246. The workspace clone routine 222 comprises computer readable instructions that when executed clone the workspace master 310 to generate a workspace clone 410, as shown and described further in conjunction with the embodiments of FIG. 3 and FIG. 4. The filesystem clone routine 244 may include computer readable instructions that when executed clone the substrate filesystem 604 (e.g., the substrate filesystem to be operated on by the testing) to generate a substrate filesystem clone 406. The clone mounting module 246 may include computer readable instructions that when executed mount the workspace clone 410 to the discrete environment 412, and may also associate the workspace clone 410 with the substrate filesystem clone 406. In one or more other embodiments, the clone mounting module 246 may include computer readable instructions that when executed associate the discrete environment 412 with the substrate filesystem clone 406 (including where cloning is not utilized with the discrete environment 412, e.g., during certain embodiments associated with the certification server 800). The operations of the cloning engine 240 may occur after initiation of the discrete environment 412, but may also be effected through issuing instructions (e.g., a cloning instruction 247) that may be integrated in the environment initiation instruction 223. For example, the cloning instruction 247 may include data sufficient for the dissociated test server 400 to issue instructions for the cloning of the workspace master 310 and/or for the mounting of the workspace clone 410 by the discrete environment 412.

A test isolation engine 248 may be utilized to initiate the test scripts 707 in each of the one or more discrete environments 412. The test isolation engine 248 may include computer readable instructions that when executed select a test script 707 from the test queue 231 (e.g., selects from the one or more test scripts 707 of the test fileset 706 copied into the workspace data (such as the workspace master 310) and cloned into the workspace clone 410. The test isolation engine 248 may also include computer readable instructions that when executed (e.g., on the processor 290 of the test orchestration server 200) issue an environment execution instruction 249 to execute the test script 707 within the discrete environment 412. In one or more embodiments, the environment execution instruction 249 may be included within the environment initiation instruction 223. In one or more other embodiments, the workspace clone 410 may include references to more than one, for example all, of the test scripts 707 comprising the test fileset 706. The environment execution instruction 249 may also be included within the environment initiation instruction 223.

A result capture database 250 receives results from testing. Each test script 707, upon execution, may generate a result data 252. Collectively, each result data 252A through result data 252N may be referred to as the result set 251. In one or more embodiments, the test fileset 706 may carry out a regression test, for example to test whether a design version 504 regressed such that it exhibited one or more errors and/or to confirm that a recent changes to hardware, code, or configuration have not adversely affected existing features. The testing and the result data 252 may measure a quality metric, functional characteristic, a functional measure, or other aspect of the design fileset 502. In one or more embodiments, the result data 252 includes a "pass" designation (e.g., the test passage 253) or a "fail" designation (the test failure 254). For example, the result data 252 may include a binary test in which a '1' specified a test failure 254 and a '0' specifies a test passage 253. In another example, the testing may compute, measure, or compare an algorithm to an expected behavior or metric (e.g., a power usage estimation of software and/or hardware). In a specific example, the testing may test an oil well drilling control software, for example simulating performance of the software in controlling a simulated drill through simulated layers of various geological features and types of rock. The result capture database 250 may also be stored on a different server, including but not limited to the dissociated test server 400, and may be implemented by a high transaction key-value store which may permit rapid storage of the test scripts 707 that may be processed in parallel through the discrete environments 412. In one or more embodiments, the result capture database 250 may serve as short term storage which may later be moved for retention and/or deleted from the result capture database 250.

A test evaluation routine 256 may be utilized to evaluate the output of the test fileset 706 and/or one or more of the test scripts 707 of the test fileset 706, and, once evaluated, to take one or more actions in response to the output. In one or more embodiments, the test evaluation routine 256 may comprise computer readable instructions that when executed evaluate the result data 252 and determine a test passage 253 or a test failure 254. Upon determination of a test failure 254, the test evaluation routine 256 may directly (e.g., on the test orchestration server 200) and/or through remote procedure call to the certification server 800 assign a unique identifier to the substrate filesystem clone 406 and designate the substrate filesystem 604 and/or the substrate filesystem clone 406 for storage retention in a computer memory (e.g., within the filesystem storage 650 of FIG. 6). In one or more embodiments, there may be at least one instance of the result data 252 for each instance of the test script 707 executed. For example, in a test fileset 706 having three hundred distinct tests (e.g., each represented by a test script 707), running the test may result in a result set 251 with at least or exactly three hundred constituent instances of the result data 252. In one or more embodiments the result data 252 may be a log file of the output of the test script 407.

A report generation module 257 may process the result set 251 and may generate a test report 258 for consumption by the user 102, for auditability purposes and/or for other documentation purposes. The report generation module 257 may include computer readable instructions that when executed (e.g., on the processor of the test orchestration server 200) generate the test report 258 including one or more instances of the result data 252, and then return to the computing device 100 of the user the one or more instances of the result data 252 and/or the test report 258. For example, the test report 258 may include a series of entries, where one entry corresponds to each instance of the test script 707 in the test fileset 706. The test report 258 may include, for example, for each entry: a name of the test script 707 or other identifier, a version number of the test script 707, an execution time, a processing time, a memory usage, a pass indicator, a failure indicator, a performance metric, a statistic, and/or other information. The test report 258 may also include information about the test, such as the runtime environment of the discrete environment 412 (e.g., including an operating system and version of the operating system such as Linux distribution version (Centos, Ubuntu (e.g., version 10, 12, 16)), Debian, Slackware, Suse, Red Hat, etc.), a root name or other identifier of the substrate filesystem 604 operated on, etc.

Figure 3:
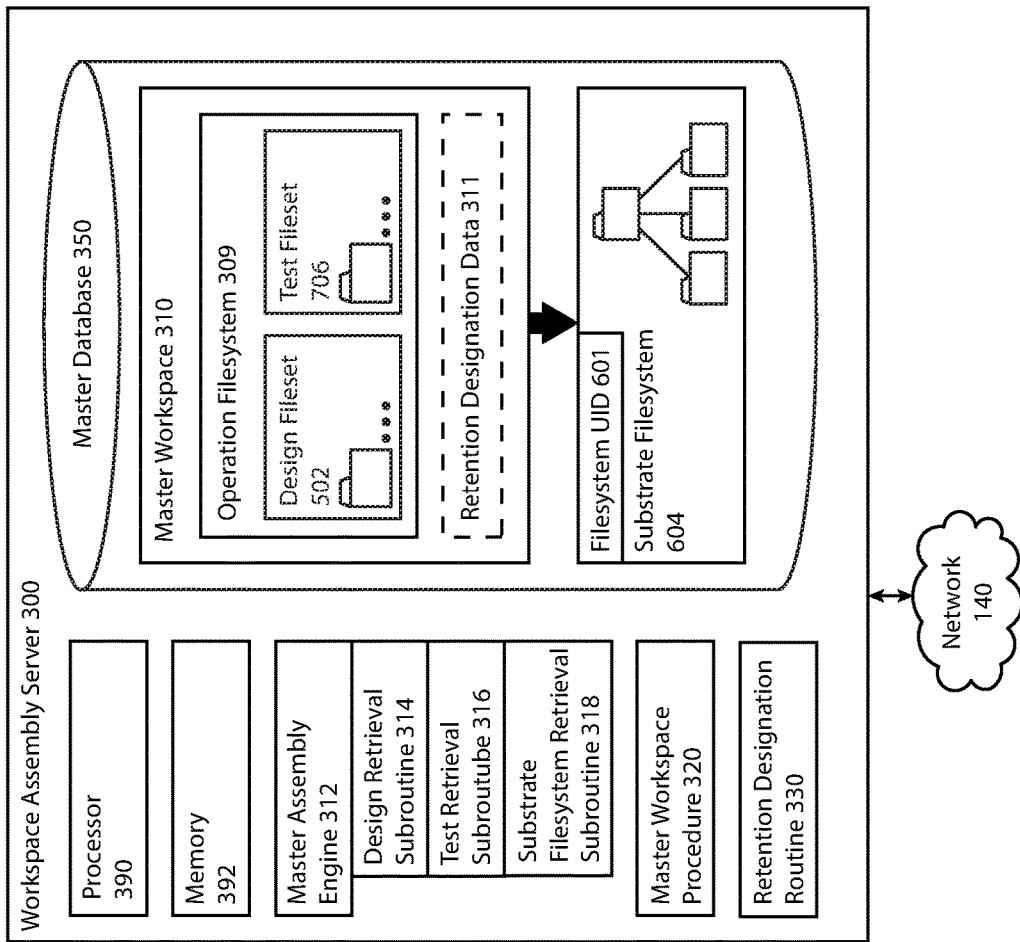
FIG. 3 illustrates the workspace assembly server of FIG. 1 that may assemble a workspace master for isolation testing, the workspace assembly server including a master assembly engine, a workspace master procedure, a master database storing a workspace master comprising an operation filesystem, a design fileset of the component, a test fileset, and a substrate filesystem to be operated on (e.g., by a script of the test fileset), according to one or more embodiments.

FIG. 3 illustrates the workspace assembly server 300, according to one or more embodiments. The workspace assembly server 300 includes a processor 390 that is a computer processor and a memory 392 that is a computer memory. A master assembly engine 312 may be utilized to assemble a workspace master 310. When utilizing cloned workspaces (e.g., the workspace clone 410 which may be usable for efficient isolation testing), the workspace master 310 may act as the master for each of the clones. The master assembly engine 312 may include a design retrieval subroutine 314, a test retrieval subroutine 316, and/or a substrate filesystem retrieval subroutine 318.

The design retrieval subroutine 314 includes computer readable instructions that when executed copy the design fileset 502 into an operation filesystem 309. The design fileset 502 may be retrieved from the design storage server 500 with the design version UID 501 of the design version 504 that may be received by the testing request 105 and/or through the test orchestration server 200. The operation filesystem 309 may be initiated within the master database 350 as an empty filesystem prior to the first data being copied into the workspace assembly server 300 (e.g., data of the design fileset 502). The test retrieval subroutine 316 may include computer readable instructions that when executed copy the test fileset 706 into the operation filesystem 309. The test fileset 706 may be retrieved from the test storage server 700 with the test version UID 701 of the test version 708 that may be received by the testing request 105 and/or through the test orchestration server 200. The substrate filesystem retrieval subroutine 318 includes computer readable instructions that when executed copy a filesystem root (e.g., the filesystem root 605A of FIG. 6) of the substrate filesystem 604 (the substrate filesystem to be operated on by at least one of the one or more test scripts 707). The substrate filesystem 604 may be retrieved from the design root filesystem server 600 with the filesystem UID 601 that may be specified in the testing request 105 and/or through the test orchestration server 200.

A workspace master procedure 320 includes computer readable instructions that, when executed, read-only protect the workspace master 310. The workspace master procedure 320 may initiate a copy-on-write data structure requiring that only clones of the workspace master 310 can be created. The clones may be modified despite the read-only protection of the master. The clones may be stored in a data structure that may sometimes be referred to in the art of computer data storage as "cheap copies," as shown and described in conjunction with FIG. 4.

Each clone may be implemented through a copy-on-write version of a master. A copy-on-write data structure (which may also be known as "CoW", "COW", "implicit sharing", and/or "shadowing") may be a resource-management technique that may be known in the art of computer programming to efficiently implement a "duplicate" operation on modifiable data resources using an empty data shell with references to the master. If a data resource is duplicated in this fashion but not modified, it may no longer be necessary to create a new resource through a copy operation; the resource may be sharable between the duplicate and the original. Modifications may still create a copy, but the copy may be deferred until the first write operation. The modified clone may only require a copy operation to occur within a part of the stored data (e.g., within storage addresses storing a single file of a fileset; within several sectors of a hard drive allocated to store a binary large object, etc.). By sharing data resources in this way, it may be possible to significantly reduce the resource consumption of unmodified copies, while adding a relatively small overhead to resource-modifying operations.

Although the workspace master 310 and substrate filesystem 604 are shown in the embodiment of FIG. 3 as stored in the master database 350 (e.g., which may be a copy), the workspace assembly server 300 may alternatively define the workspace master 310 on the workspace assembly server 300 while storing and designating for read-only protection the data and files comprising the workspace master 310 in one or more remote storage locations (e.g., on the design server 500, the root filesystem server 600, and/or the test storage server 700). Therefore, in one or more embodiments, the read-only protection may be effected within the one or more remote storage locations.

A retention designation routine 330 may include computer readable instructions that when executed designate one or more data elements within the master database 350 for retention, for example the workspace master 310 (as shown in the embodiment of FIG. 4) and/or the substrate filesystem 604. To illustrate with another example, the retention designation routine 330 may receive a notification transmission through the network 140 from the test orchestration server 200, the dissociated test server 400, and/or the certification server 800, which specifies that the workspace master 310 and/or the substrate filesystem 604 should be retained. Retention may be necessary where modifications were made to data in the memory addresses of the clone (e.g., the substrate filesystem clone 406), and without the master (e.g., the substrate filesystem 604) the clone would store insufficient information to re-constitute a complete set of modified data (e.g., the substrate filesystem 604 with the changes made to the substrate filesystem clone 406).

The master database 350 may be stored in a computing storage and/or computing memory of the workspace assembly server 300. Together, the design fileset 502 and the test fileset 706 define what may be referred to as the "workspace data", and in the context of the workspace assembly server 300 forms the workspace master 310. The substrate filesystem 604 may be mounted to the workspace master 310, but may be stored separately from the operation filesystem 309. The workspace master 310 may have associated, at the time of assembly and/or following evaluation of test result, a retention designation data 311. In one or more embodiments, including in association with testing reproducibility of certification server 800, the workspace data may setup for direct execution of one or more of the test scripts 707. The workspace data may be loaded with the design version 504 of the design fileset 502 and/or the test version 708 of the test fileset 706. The loading may be effected through a copy operation (and/or a clone operation, as shown and described herein).

FIG. 4 illustrates one or more dissociated test servers 400, the dissociated test server 400A through the dissociated test server 400N, according to one or more embodiments. For clarity, the dissociated test server 400A is discussed in greater detail. However, the elements and processes of the dissociated test server 400A may also be scaled to one or more other instances of the dissociated test server 400B through the dissociated test server 400N.

The dissociated test server 400A includes a processor 490, a memory 492, and a storage 494. For example, the dissociated test server 400 may be implemented with hardware including x86 type platform, a Dell Poweredge R6515, and similar processes. The dissociated test server 400A may further include a kernel 496 of an operating system (e.g., Linux, Windows® Server), a virtual memory 497, and a filesystem 498. Together, the processor 490, the memory 492, the storage 494, the kernel 496, the virtual memory 497, and the filesystem 498 may be referred to as the computing resources pool 499 which may be made available to one or more instances of the discrete environment 412.

The discrete environment 412 may be initiated on the dissociated test server 400A, for example in response to the environment initiation instruction that may be received from the test orchestration server 200. In the embodiment of FIG. 4, a specific implementation of the discrete environment 412 is shown as the container 413 that is a computing container (e.g., a Docker® container, a CoreOS rkt container, an LXC Linux container, a Mesos® container, an OpenVZ® container, a Windows® Server Container, etc.). In one or more alternative embodiments, the dissociated test server 400A may utilize virtual computers with a hypervisor (e.g., VMWare®, Qemu, etc.). In one or more other embodiments, virtual computers may spawn and/or 'spin up' containers for use.

The container 413 may have an environment UID 411. Initiation of the container 413 includes receiving access to and/or an allotment of resources from the computing resources pool 499, including the processing power allocation 491, the memory allocation 493, and optionally an allocation of storage 495. The allocation of the computing resources pool 499 may include a virtual memory allocation and access to the kernel (not shown in the embodiment of FIG. 4). Each initiated instance of the container 413 may receive at least: a workspace clone 410 having an operation filesystem clone 409, a design fileset clone 402, and a clone and/or a copy of the test script 707 which is shown and referred to as the test script 407. The test script 407 may be extracted from the test queue 231. The container 413 may mount a substrate filesystem clone 406.

The dissociated test server 400A receives the cloning instruction 247 and the workspace master 310 is cloned to form the workspace clone 410. Similarly, the substrate filesystem clone 406 is mounted. The container 413 and the substrate filesystem clone 406 may be collectively referred to as the runtime instance 415.

Figure 16:
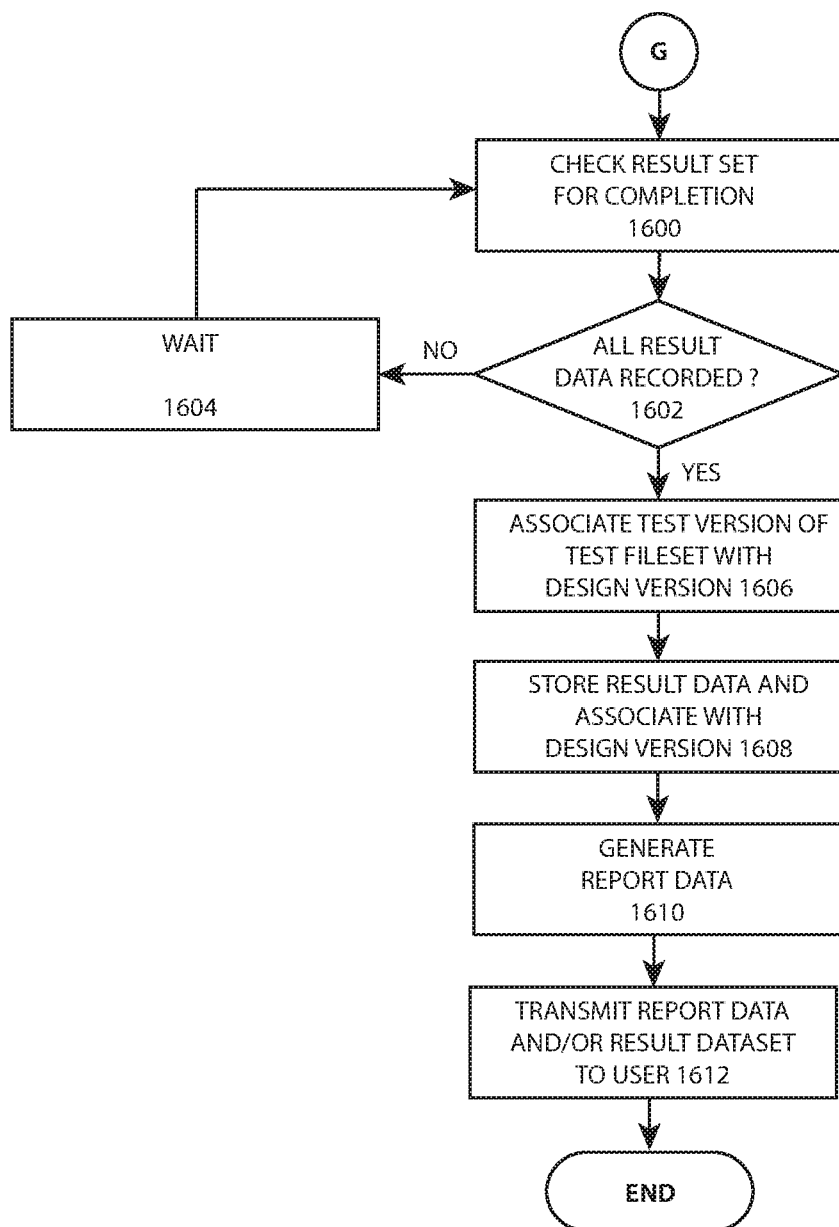
FIG. 16 illustrates a test recording and report generation process flow for determining a test completion, storing the result data that results from the testing, and optionally generating a human-readable test report based on the result data, according to one or more embodiments.

The container 413 then reads the environment execution instruction to execute the test script 407 on the design fileset clone 402. The execution of the test script 407 may modify the substrate filesystem clone 406, for example to create a file, delete a file, rename a file, store data, create a directory, move a directory, add data, and/or delete data. In another example, the execution of the test script 407 may perform any one or more actions within each the discrete environment 412: open a socket, open a communication port, close a socket, close a communication port, obtain virtual memory from the kernel (e.g., the virtual memory 497 of the kernel 496), manipulate c-groups of the kernel, obtain quotas of system calls from the kernel, and/or obtain a data buffer cache. A modified file of the substrate filesystem clone is shown in FIG. 16 as the modified file 416. The result data 252 is generated and may be stored on the memory allocated to the container 413 and/or transmitted through the network 140 to the result capture database 250.

In the embodiment of FIG. 4, a test may have been initiated comprising a test fileset 706, fractionated and queued as 'N' instances of the test script 707, specifically the test script 707A through test script 707N. Each test script 707 may be withdrawn from the test queue 231 and have dedicated instances of the container 413A through container 413N initiated. A copy and/or clone of each test script 707 may be stored on each of the containers 413A through the container 413N as the test script 407A through the test script 407N, respectively. Execution of the test script 407A through the test script 407N may result in generation of the result data 252A through the result data 252N that comprises the result set 251 of execution of the test fileset 706. The dissociated test server 400 may be replicated and/or horizontally scaled to parallel process and/or to expand resources for faster testing and/or additional multitenant users. In the present example, where each action such as initiation of the container 413, execution of the test script 407, and tear-down of the container 413 requires a time period of between 5 seconds to 20 seconds, the dissociation test server 400 may be horizontally scaled to include a dissociation test server 400A (e.g., allocated 8 instances of the container 413A through the container 413H), a dissociation server 400B (e.g., allocated another eight instances of the container 413I through the container 413P), and a dissociated test server 400C (e.g., allocated yet another eight instances of the container 413Q through the container 413X).

In one or more embodiments, the dissociated test server 400 may include a first set of computer readable instructions that when executed initiate a new instance of the operation filesystem (e.g., the operation filesystem clone 409) for a workspace data to operate from. A second set of computer readable instructions stored on the dissociated test server 400, when executed, may in turn execute at least one of the environment initiation instruction 223, the resource allocation instruction 225, the tear-down instruction 227, and/or the cloning instruction 247. A third set of computer readable instructions, when executed, may: (i) execute the test script 407; (ii) modify the substrate filesystem clone 406 through execution of the test script 407 (e.g., to generate the modified file 416); (iii) generate a result data 452; and/or (iv) transmit the result data 252 to a result capture database 250. A fourth set of computer readable instructions when executed may return to the computing resources pool 499 the processing power allocation 491 and the allocation of computing memory 493 upon tear-down of the discrete environment 412 (e.g. termination of the container 413 in the embodiment of FIG. 4).

Figure 5:
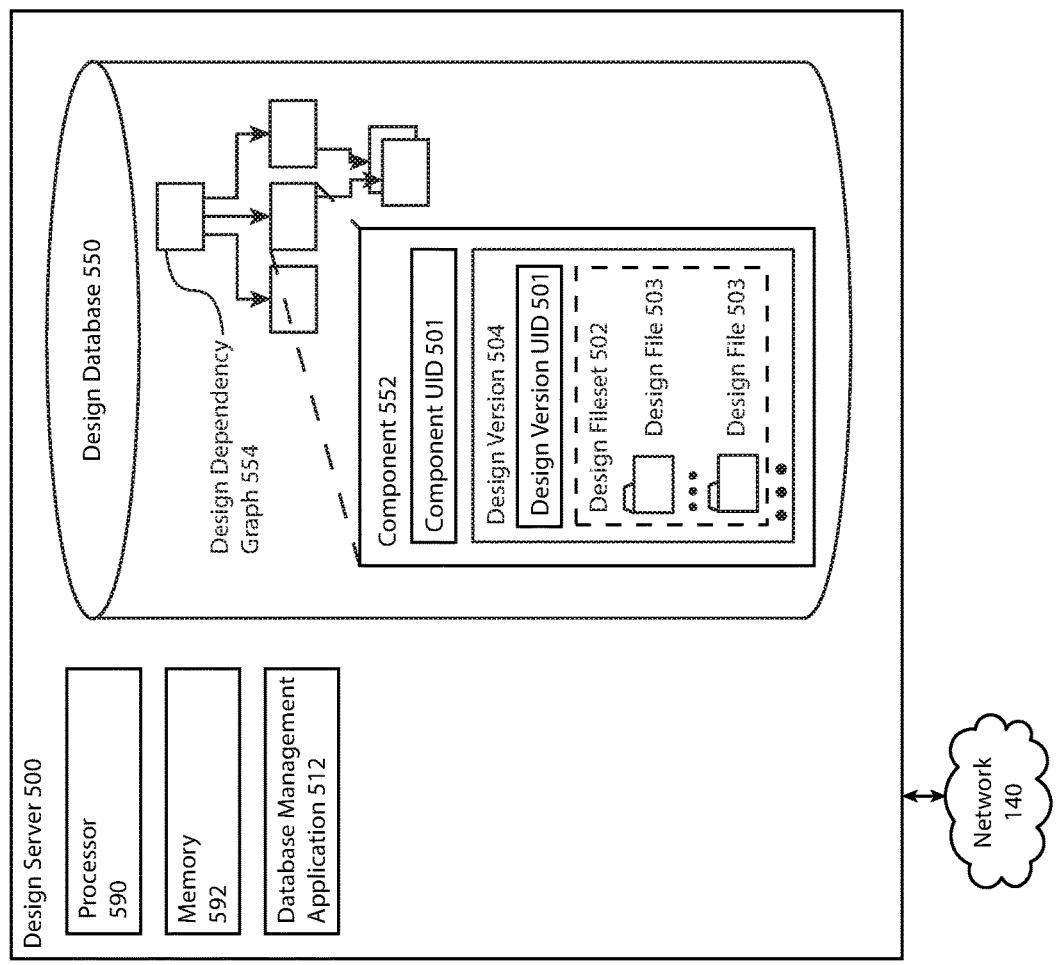
FIG. 5 illustrates the design server of FIG. 1, including a design database and database management application of the design server, the design database storing one or more design filesets, each of which may have one or more versions as a design version optionally stored within a design dependency graph (e.g., a design component hierarchy), according to one or more embodiments.

FIG. 5 illustrates the design server 500, according to one or more embodiments. The design server 500 includes a processor 590 that is a computer processor and a memory 592 that is a computer memory. The design server 500 is communicatively coupled to the network 140. A database management application (such as the database management application 512 and/or the database management application 712) is software that responds to queries and manages reads, writes, data organization and data structure, logical organization, and other aspects of data storage for a database (e.g., the design database 550, the test database 750). The database management application (e.g., the database management application 512 and/or the database management application 712 of FIG. 7) may be a commercial database application such as Perforce®, Git®, MongoDB®, Subversion®, and may administer data in an SQL (e.g., relational) and/or a "no-SQL" (e.g., columnar, graph, key-value, entity-attribute-value) logical model. The database management application 512 may read-only protect one or more design versions 504 in such case where the elements of the workspace master 310 are to be retained on the design server 500.

The design database 550, which may be stored on the memory 592 and/or storage of the design server 500, is a database for storing and organizing design-related data, including a design dependency graph 554, one or more components 552 that may be stored as nodes of the design dependency graph 554, one or more design version 504 of each component 552 and/or one or more design version 504 of a design fileset 502, one or more design filesets 502, and/or one or more design files 503 of each design fileset 502. The design dependency graph 554 is shown and described in greater detail in conjunction with the embodiment of FIG. 9.

In one or more embodiments, the design database utilizes the design dependency graph 554 to store, organize, attach metadata, and/or define relationships between design data. The design dependency graph 554 may be useful for certain types of component design, for example, integrated circuit (IC) design software in which each component 552 (which may be referred to within the art as an 'IP') may have a complex dependency chain. The design dependency graph 554 may be a hierarchy of nodes in which a design version 504 of a component 552 acts as a root, the design version 504 drawing references through one or more directed edges (e.g., the edges 901 of FIG. 9) to one or more design versions 504 of sub-components 552 of the root. The component 552 may store metadata related to the component, with respect to testing, for example, user configuration, and configuration options. A testing request 105 that specifies the design version UID 501 extracts and includes in the workspace master 310 the design fileset 502A through the design fileset 502N of the root node and optionally each dependency within the design dependency graph 554.

In one or more alternate embodiments, the design dependency graph 554 data structure is not utilized. For example, the design database 550 may be stored in a filesystem, where a component 552 is modeled as a directory, each design version 504 is modeled as a sub-directory, and both the directory and each sub-directory hold a design fileset 502 of one or more design files 503. In such case that the elements of the workspace master 310 are to be retained on the design server 500 when defining the workspace master 310, the database management application 512 may read-only protect one or more design versions 504 at the time the workspace master 310 is defined.

Figure 6:
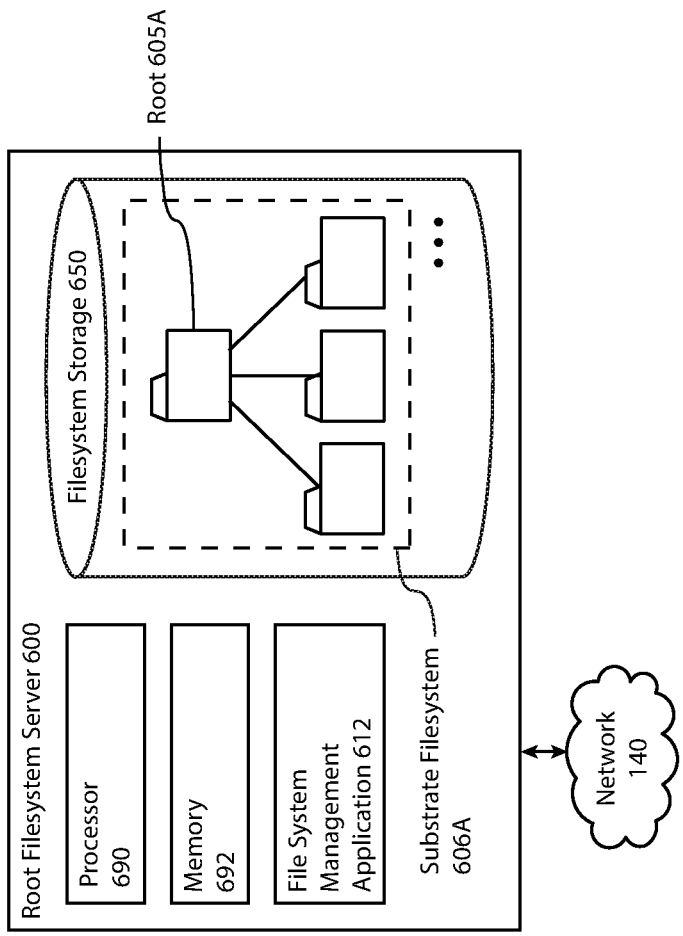
FIG. 6 illustrates the root filesystem server of FIG. 1, including a filesystem storage and a filesystem management application of the root filesystem server, with the root filesystem storing the substrate filesystem to be operated on by the test script and which may be cloned to generate the substrate clone of FIG. 4, according to one or more embodiments.

FIG. 6 illustrates a root filesystem server 600, according to one or more embodiments. The root filesystem server includes a processor 690 that is a computer processor and a memory 692 that is a computer memory. The root filesystem server 600 may be communicatively coupled to the network 140. A filesystem management application 612, for example, may be based on Perforce®, Git®, MongoDB®, Subversion®, and other relational and non-relational databases or filesystems. The root filesystem server 600 may be accessed through a network protocol over the network 140 such as Network Filesystem (NFS), iSCSI, SMB, CIFS, and/or a SAN. The filesystem storage 650 may store one or more substrate filesystems 606, each having a root 605. In the embodiment of FIG. 6, one instance of the substrate filesystem 606 is illustrated, the substrate filesystem 606A (which is shown as having the root 605A). The substrate filesystem 606A may be identified by a filesystem UID 601, for example the name or other identifier of the root 605A. The substrate filesystem 606 may be a filesystem intended to be acted on or modified by one or more test scripts 707 and/or test scripts 407. In one or more embodiments, the filesystem storage 650 may store instances of the substrate filesystem 606 intended for general testing (e.g., a generic instance of the substrate filesystem 606 that may work for a wide variety of tests). In one or more embodiments, the filesystem storage 650 may store specialized instances of the substrate filesystem 606 intended for specific tests or testing purposes (e.g., a posix compliant filesystem, an NTFS filesystem, a UFS filesystem, a VXFS filesystem, a DOS filesystem, an APFS filesystem, a WAFL filesystem, a filesystem having specialized organizations of directories or characters defined). In such case that the elements of the substrate filesystem 606 mounted to the workspace master 310 by the workspace assembly server 300 are to be retained on the root filesystem server 600, the filesystem management application 612 may read-only protect one or more substrate filesystems 606.

Figure 7:
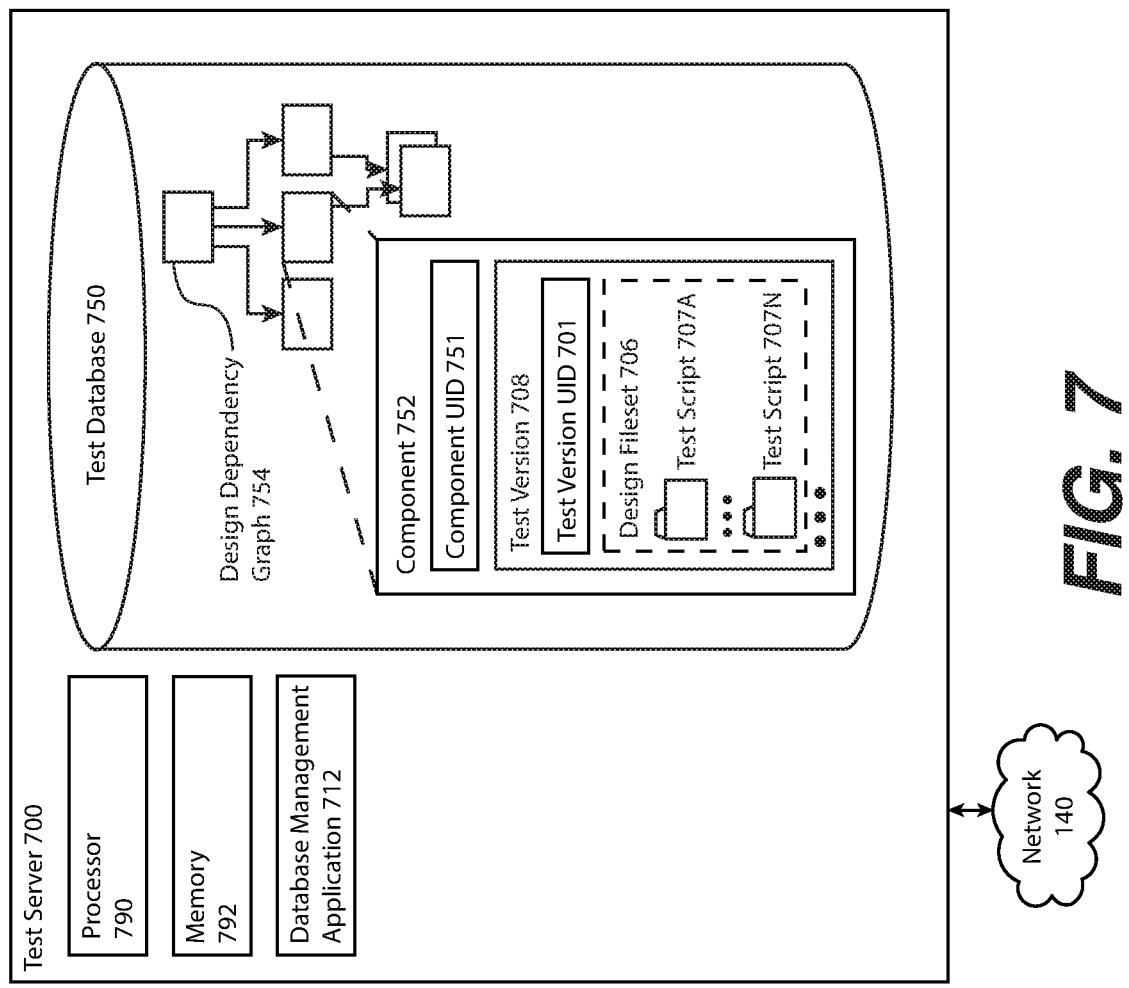
FIG. 7 illustrates the test storage server of FIG. 1, including a test database management application of the test storage server, and the test database storing one or more test scripts as a test version, according to one or more embodiments.

FIG. 7 illustrates a test storage server 700, according to one or more embodiments. The test storage server 700 includes a processor 790 that is a computer processor and a memory 792 that is a computer memory. In one or more embodiments, depending on intended use, each test may also be modeled as a component 752 within a test dependency graph 754, as shown in FIG. 7. However, the test version 708 may or may not require dependency modeling. In one or more embodiments, the test database 750 may be implemented with a simple filesystem, where a component 752 may be modeled as a directory, each test version 708 modeled as a sub-directory, and where the directory and each sub-directory holds a test fileset 706 of one or more test scripts 707 (e.g., the test script 707A through the test script 707N). In such a case that the elements of the substrate filesystem 606 mounted to the workspace master 310 by the workspace assembly server 300 are to be retained on the root filesystem server 600, the database management application 712 may read-only protect one or more test versions 708 when the workspace master 310 is defined. Clones may then be generated directly from the rea-only test version 708.

Figure 8:
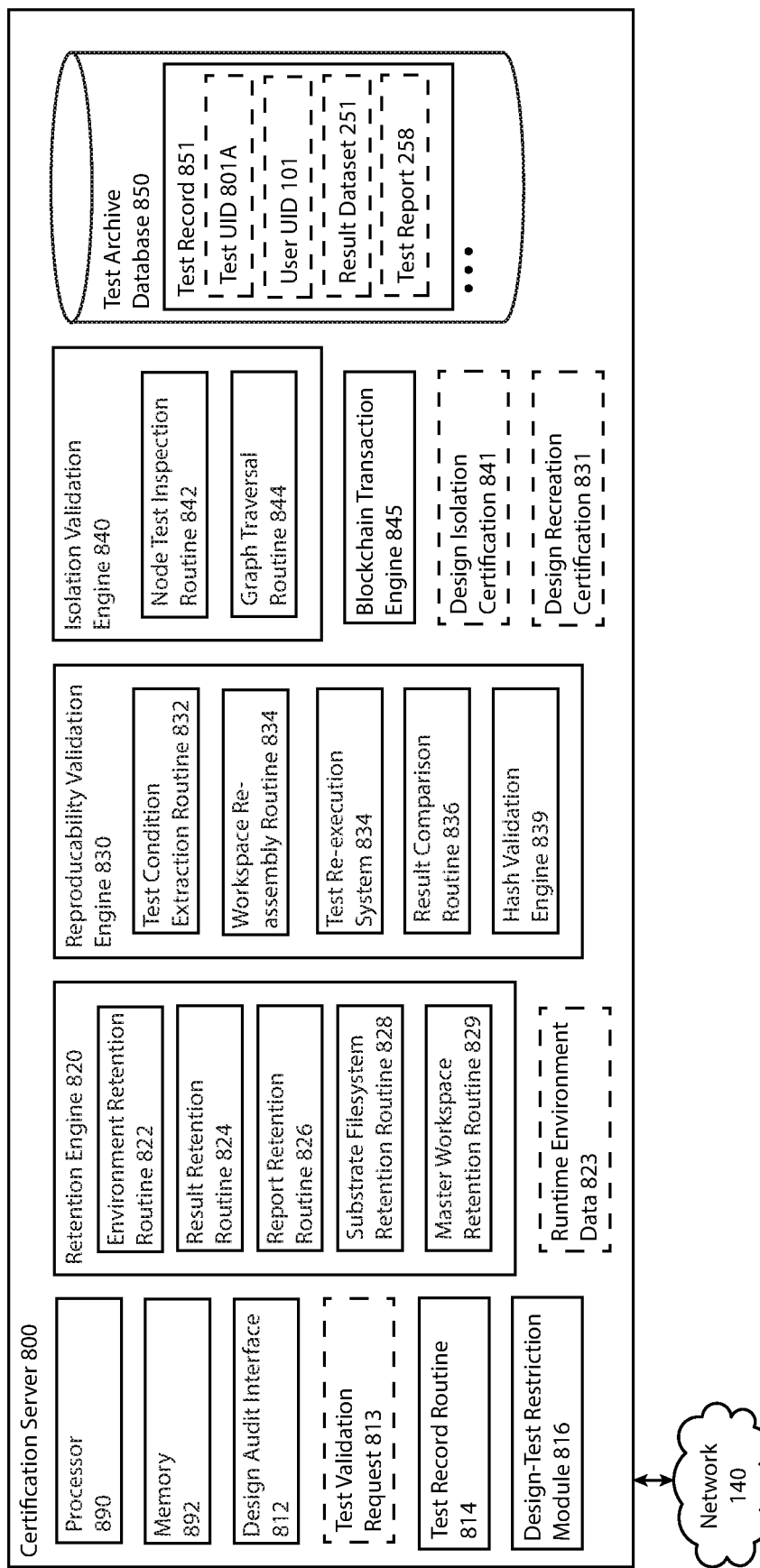
FIG. 8 illustrates the certification server of FIG. 1 that may coordinate retention of data associated with testing and may be usable to query previous test records, determine isolation testing, and/or determine re-producibility, the certification server including a design audit interface, a test record routine, a retention engine, a re-producibility validation engine, an isolation validation engine, and a blockchain transaction engine, according to one or more embodiments.

FIG. 8 is a certification server 800 which may be used to retain data for auditing and/or to certify testing of a design version 504, according to one or more embodiments. The certification server 800 includes a processor 890 that is a computer processor and a memory 892 that is a computer memory. The certification server 800 is communicatively coupled to the network 140.

A design audit interface 812 permits a user 102 to set data retention parameters, query testing that has occurred on one or more design versions 504, and/or generate one or more test validation requests 813 with respect to design versions 504. The user 102 may be, for example, a software developer or another person who may need to access records (e.g., a legal department, an accounting firm, a certification organization, etc.). The design audit interface 812 may comprise computer readable instructions that when executed generate a validation request 813 to validate that the design version 504 has undergone an isolation testing. The design audit interface 812 may also comprise computer readable instructions that when executed generate a validation request to validate a previous testing of the design version 504 is reproducible, for example generating consistent results and/or output. The validation request 813 may include the unique identifier of the design version 504 of the design fileset 502 (e.g., the design version UID 501). The design audit interface 812 may include computer readable instructions to generate a graphical user interface which may be utilized by a user 102 to navigate any design dependency graph 554 for selection of a design version 504. In one or more embodiments, the design audit interface 812 may be accessible through the computing device 100, including but not limited to access through a plugin software application of the development application 104. The design audit interface 812 may also include a searchable index of tests by file name or version.

A test recording routine 814 comprises computer readable instructions that when executed define a database relation associating a design version 504 of a design fileset 502 and a test version 708 of a test fileset 706. For example, the test recording routine 814 may define the database relation 900 (as shown and described in conjunction with FIG. 9), along with storing metadata such as a time when the testing was initiated, the user UID 101 of the user 102 requesting the testing, and other data about the testing. Each testing may also be logged, recorded, and/or indexed in a distinct database (e.g., the test archive database 850) by the test recording routine 814. For example, the test archive database 850 may be a separate relational database maintaining records of each testing (e.g., the test record 851), the database relation 900 between data of the tests, and/or testing validation logged by the certification server 800. In one or more embodiments, upon receipt of the testing request 105, a unique identifier of the test (e.g., the test UID 801) may be generated and assigned. The test UID 801 may also be used as the session identifier. In one or more embodiments, the test recording routine 814 may store the test record 851 in the test archive database 850, including test UID 801, the user UID 101 of the user 102 requesting the test (e.g., generating the testing request 105), the result set 251, the test report 258, and/or other data.

A design-test restriction module 816 may restrict modification of design and/or test files or test data once a testing is completed on the design, for example such that the testing can be proven to have occurred and/or may be capable of reproduction. A design-test restriction module 816 may include computer readable instructions that when executed place a deletion restriction on at least one of the design version 504 of the design fileset 502 and the test version 708 of the test fileset 706. The deletion restriction may be completed through a variety of methods and/or mechanisms, including read-only protecting a design version 504A in the design database 550 such that any future modifications to the associated design fileset 502A are made to the design version 504B which may be a new version copied from the design version 504A. Restriction on editing of the design data and/or test data may be made in association with the blockchain transaction engine 845, as described below.

A retention engine 820 may initiate one or more processes to retain data related to testing, including but not limited to storing data, test environments, and/or clones, and the retention engine 820 may also associate stored data (e.g., through one or more database relations 900) with the design version 504 and/or the test version 708. The retention engine 820 may store data for the purposes of documenting testing generally and/or storing data which may be useful for subsequent analysis (e.g., identifying a specific test failure by assessing modifications and/or lack of expected modification to the substrate filesystem clone 406). The retention engine 820 may include an environment retention routine 822, a result retention routine 824, a report retention routine 826, a substrate filesystem retention routine 828, and/or a workspace retention routine 829. The environment retention routine 822 may include computer readable instructions that when executed archive a runtime environment data 823 specifying a runtime environment of one or more discrete environments 412 executing test scripts 407 in association with testing of a test fileset 706. The environment retention routine 822 may further include computer readable instructions that when executed issue a runtime retention instruction (not shown in the embodiment of FIG. 8) to define a database relation (e.g., an instance of the database relation 900 of FIG. 9 between the design version 504 and the runtime environment data 823).

The result retention routine 824 may include computer readable instructions that when executed archive one or more instances of the result data 252 and/or the result set 251. The result retention routine 824 may further include computer readable instructions that when executed define a database relation (e.g., an instance of the database relation 900) between the design version 504 and the result data 252 and/or the result set 251. Similarly, the report retention routine 826 may include computer readable instructions that when executed archive one or more instances of the test report 258. The report retention routine 826 may further include computer readable instructions that when executed define a database relation (e.g., an instance of the database relation 900) between the design version 504 and the test report 258.

The substrate filesystem retention routine 828 includes computer readable instructions that when executed designate the substrate filesystem 604 and/or the substrate filesystem clone 406 for storage retention in a computer memory. In one or more embodiments, the substrate filesystem retention routine 282 may be utilized for any instance of the discrete environment 412 generating a result data 252 having a test failure 254 and for which a modification to the substrate filesystem clone 406A was made through execution of the testing (e.g., the substrate filesystem clone 406A of FIG. 4 having the modified file 416). In one or more embodiments, there may be several instances of the substrate filesystem clone 406 retained following completion of the testing (especially where multiple instances of the test failure 254 result). The substrate filesystem clones 406 and any substrate filesystem 604 may be stored in the test archive database 850.

The workspace retention routine 829 may retain the workspace master 310 and/or one or more instances of the workspace clone 410 utilized in a testing. The workspace retention routine 829 may include computer readable instructions that when executed designate the workspace master 310 for retention, for example, by remote procedure call to retention designation routine 330 of the workspace assembly server 300 to store the retention designation data 311. The workspace retention routine 829 may also include computer readable instructions that when executed retain one or more instances of the workspace clone 410 (e.g., any instance of the workspace clone 410 for a discrete environment 412 generating a result data 252 having a test failure 254). The workspace master 310 and/or the one or more workspace clones may be stored in the test archive database 850.

A reproducibility validation engine 830 may reproduce the environment in which a design version 504 was previously tested, initiate re-testing of the design version 504 according to previous parameters, and/or compare a result data 252 and/or a result set 251 of a previous testing to a result data 252 and/or a result set 251 of a reproduction testing. The reproducibility validation engine 830 may include a test condition extraction routine 832, a workspace re-assembly routine 834, a test re-execution system 836, a result comparison routine 838, and/or a hash validation engine 839. In one or more embodiments, each of one or more of the elements of the reproducibility validation engine 830 may reproduce the execution of part or all of the testing associated with a test fileset 706 (e.g., each test script 707A through test script 707N). In one or more embodiments, the reproducibility validation engine 830 may reproduce the execution of a single instance of a test script 707 with respect to a design fileset 502. This mode of reproduction testing may be useful to reproduce or examine a single instance of the result data 252, including a test failure 254 and/or test passage 253.

The test condition extraction routine 832 includes computer readable instructions that when executed query and then retrieve the design fileset 502, the test fileset 706, the substrate filesystem 604, and/or the runtime environment data 823. As shown and described in conjunction with FIG. 9, the test condition extraction routine 832 may read one or more database relations 900 defined in association with the design version 504, which may be within the design dependency graph 554. Alternatively, or in addition, the test condition extraction routine 832 may read a testing record stored in the test archive database 850 (e.g., the test record 851) to extract and query unique identifiers of components of the previous testing (e.g., the design version UID 501, the test version UID 701, etc.).

The workspace re-assembly routine 834 rebuilds the workspace data utilized in the previous testing. The workspace data may be reassembled within the workspace assembly server 300, or in a separate system or server dedicated for re-testing purposes (e.g., a dedicated testing server or the computing device 100). The workspace re-assembly routine 834 may include computer readable instructions that when executed re-assemble the workspace data and/or the workspace master 310. In one or more embodiments, the workspace re-assembly routine 834 may act as a machine-user that generates an instance of the testing request 105 to initiate the re-testing, which may be analogous to submission of the testing request 105 for the previous testing to be reproduced.

The test re-execution system 836 may generate an instruction to execute one or more of the test scripts 707 of the test fileset 706 within the re-assembled instance of the workspace data. In one or more embodiments, the test re-execution system 836 includes computer readable instructions that, when executed, executes and/or generates an instruction to execute a test script 707 in the workspace data utilizing the runtime environment data 823 to generate a new instance of the result data 252. In one or more embodiments, the re-execution system 836 may request execution of one or more of the test scripts 706 through submission of the testing request 105. Alternatively or in addition, the re-execution system 836 may include access to its own computing resources for testing.

The result comparison routine 838 compares results from the previous testing (e.g., the original testing) and the reproduction testing (e.g., the re-testing). The result comparison routine 838 may include computer readable instructions that when executed: (i) retrieve the result data 252 of the previous testing and/or result set 251 of the previous testing from storage (e.g., from the test archive database 850), (ii) optionally retrieve the test report 258 of the previous testing; (iii) retrieve the result data 252 of the reproduction testing and/or the result set 251 of the reproduction testing; (iv) optionally retrieve the test report 258 of the reproduction testing, and (v) compares the result data 252 of the previous testing, the result set 251 of the previous testing, and/or the test report 258 of the previous testing with the result data 252 of the reproduction testing, the result set 251 of the reproduction testing, and/or the test report 258 of the reproduction testing. The result comparison routine 838 may include computer readable instructions that when executed determine a match between (a) the result data 252 of the previous testing, the result set 251 of the previous testing, and/or the test report 258 of the previous testing when compared with (b) the result data 252 of the reproduction testing, the result set 251 of the reproduction testing, and/or the test report 258 of the reproduction testing. Upon determination of the match, the result comparison routine 838 may execute instructions generating a design recreation certification 831 or otherwise indicate validation of the previous testing. The design recreation certification 831 may be a report sent to the user 102 initiating the test validation request 813 that the testing of the design version 504 is reproducible. The reproduction of the testing may also be logged as a testing event in the design dependency graph 554 and/or the test archive database 850, including storing metadata noting its origination from an instance of the test validation request 813. The hash validation engine 839 is discussed is conjunction with the blockchain transaction engine 845, below, and further in conjunction with the embodiment of FIG. 20.

The certification server 800 may include an isolation validation engine 840 that may be utilized to validate isolation testing of a design version 504. The isolation validation engine 840 may include computer readable instructions that when executed determine a test version 708 stored in a database (e.g., the test database 750) was utilized to test the design version 504 (e.g., a previous testing). For example, the determination may be made by identifying a database relation 900 between the design version 504 and the test version 706 and/or stored in the test archive database 850. The isolation validation engine 840 may include computer readable instructions that when executed determine that the design version 504 has undergone an isolation testing. Validation of the isolation testing may be effected by querying the test archive database 850, metadata of the component 552 and/or metadata of the design version 504 within the design dependency graph 554, and/or through identification of residue of the previous testing such as retained data (e.g., one or more workspace clones 410, the result set 251 indicating isolation testing, the test report 258, etc.).

In one or more embodiments, the isolation testing has occurred where one or more test scripts 707 (e.g., a test script 707A through a test script 707N) of the test fileset 706 are each executed in a separate instance of a discrete environment 412A through the discrete environment 512A and/or where the one or more test scripts 707 when executed have each modified a separate instance of a substrate filesystem 604 (e.g., a substrate filesystem clone 406A through a substrate filesystem clone 406N).

The isolation validation engine 840 may validate isolation testing on each of the dependencies of the design version 504 within the design dependency graph 554, according to one or more embodiments. The isolation validation engine 840 may include a node test inspection routine 842 comprising computer readable instructions that when executed determine that a node of the design dependency graph 554 (e.g., the design version 504.1B of the component 552.1 of FIG. 9) has undergone the isolation testing. The isolation validation engine 840 may further include a graph traversal routine 844 comprising computer readable instructions that when executed traverses an edge of the design dependency graph 554 (e.g., the edge 901B, as shown and described in FIG. 9) to a next node of the design dependency graph on which the design version depends (e.g., traversing from the design version 504.1B of the component 552.1 along the edge 901B to the design version 504.1C of the component 552.2, as shown and described in FIG. 9). The isolation validation engine 840 may include computer readable instructions that when executed validate the design version 504 and each of the one or more nodes on which the design version 504 depends. Data may be generated for the user initiating the test validation request 813 such as a design isolation certification 841 that is a communication indicating and/or logging the validation to a user 102.

A blockchain transaction engine 845 is usable to immutably store data related to the testing, auditing, validation, and/or certification in one or more of the present embodiments. The blockchain transaction engine 845 may utilize a hash function (e.g., SHA-256, SHA-2) to input data related to testing into the hash function, the hash function outputting a hash value (e.g., which may be a 64-character alphanumeric string) that is uniquely determined by the input data and that may change unpredictably for each unique input, as may be known in the art of computer programming and encryption. Inputting data into a hash function and generating a hash value may be referred to as "hashing". In one or more embodiments, the blockchain transaction engine 845 may include computer readable instructions that when executed input into a hash algorithm metadata of the test version 708, metadata of the test fileset 706, metadata of the design version 504 of the design fileset 502, one or more instances of pieces of the result data 252, one or more retained instances of the workspace clone 410, one or more instances of the test script 707, one or more instances of the substrate filesystem 604, one or more instances of the workspace master 310, the runtime environment data 823, data from a test record 851 of the test archive database 850, and/or other data. Such inputs may be arbitrarily grouped before hashing, or may be independently hashed.

The blockchain transaction engine 845 may include computer readable instructions that generate a blockchain transaction for a blockchain network. The blockchain network may be a distributed network of nodes maintaining a ledger database reconciled through a consensus mechanism (e.g., utilizing distributed ledger technology, or "DLT"). The blockchain deployment may be, for example, a private blockchain (e.g., based on Hyperledger®, Corda®, Ethereum Enterprise Alliance) or a public blockchain (e.g., Ethereum). The hash values and/or the input data may be communicated to a network node participating in the blockchain network that receives and stores the one or more hash values in a blockchain data structure.

The hash validation engine 839 may be utilized to verify that data associated with the testing has not changed (including through alteration). The hash validation engine 839 may re-calculate one or more hash values of previously hashed data and compare the hash values to determine one or more files have not been modified. In one or more embodiments, the hash validation engine 839 may validate hashes of any files and/or metadata as part of a response to the validation request 813. In one or more other embodiments, the hash validation engine 839 may validate hashed components utilized in a reproduction testing upon determining a mismatch in outcome between the previous testing and the reproduction testing during execution of the reproducibility validation engine 830. In one or more other embodiments, the hash validation engine 839 may check a re-calculated hash value against a hash value stored in the blockchain data structure, which may determine that data is not consistent and/or may have been tampered with.

Figure 9:
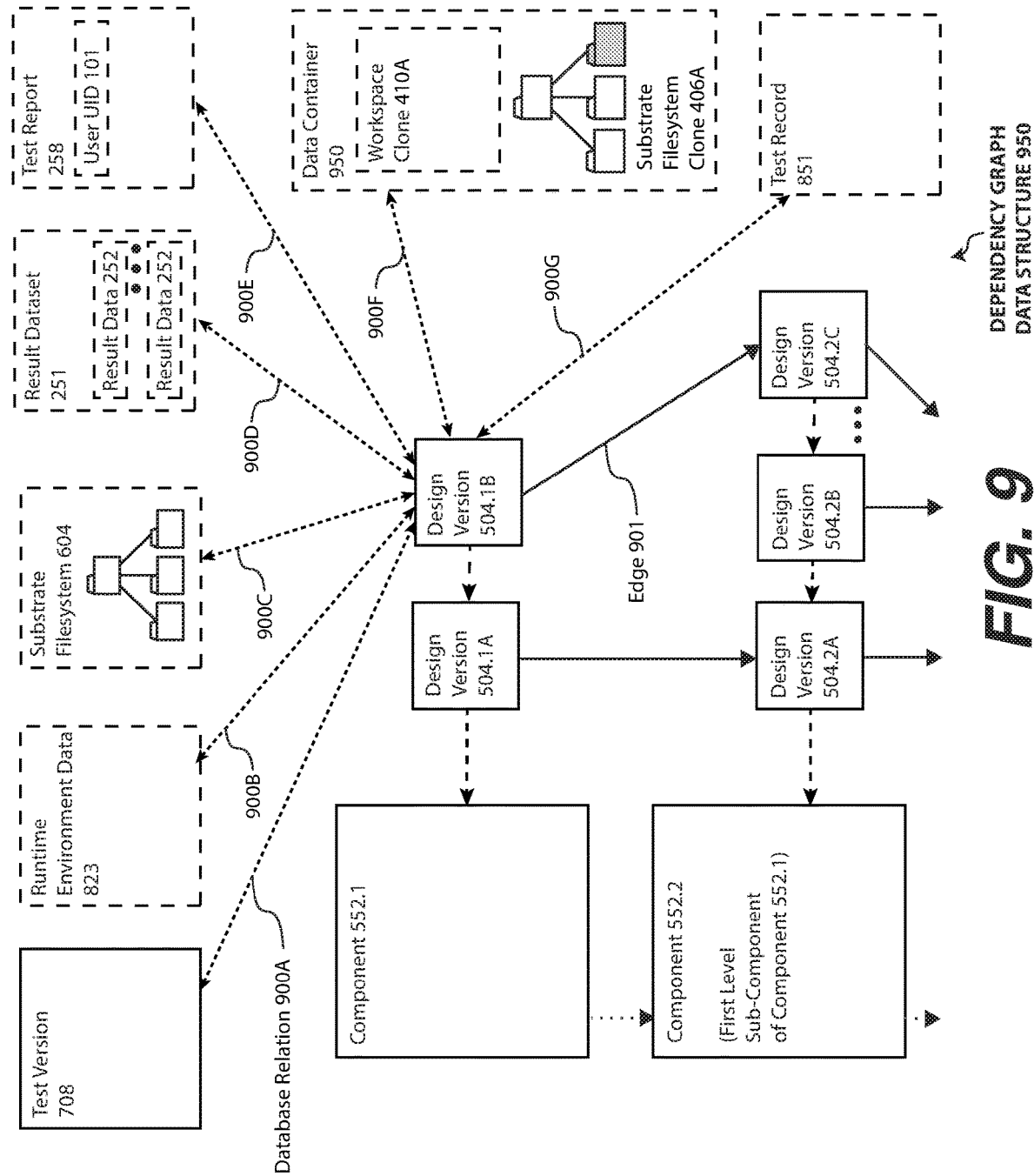
FIG. 9 illustrates an example of a dependency graph data structure that may be utilized to model a software and/or hardware component, design version, and/or design fileset, and may be used to implement the design dependency graph of FIG. 5 and/or FIG. 7, and to define database relations to testing data, including for retention of data usable for auditing purposes, according to one or more embodiments.

FIG. 9 illustrates an example of a dependency graph data structure 950 that may be utilized in the design dependency graph 554 of FIG. 5 and/or FIG. 7, including for retention of data related to the testing for auditing or validation purposes, according to one or more embodiments. The design dependency graph 554 may be comprised of a number of nodes that may model the design version 504 and a number of directed edges that model dependencies on another design version 504. The design dependency graph 554 may be a directed acyclic graph architecture and/or data structure. In one or more embodiments, each component 552 may incorporate other lower-level sub-components. In one or more embodiments, each component 552 may be incorporated as a subcomponent of a higher-level component. In the embodiment of FIG. 9, the component 552.1 depends on the component 552.2, (which is specifically a first-level sub-component of the component 552.1 (e.g., having an immediate child relationship with the component 552.1 as a parent).

Each instance of the component 552.1 may comprise one or more design versions 504.1A. The component 552 is a data entity which may be stored in a database (e.g., the design database 550) and utilized to model software, hardware, computing hardware, one or more circuits, and/or other design components. The component 552 may include one or more attributes to store data related, about, and/or describing the component, for example technical specifications about a component, specifications about legal relationships or copyright ownership, measured values of testing information, configuration options, etc. The component 552 may be instantiated in one or more design versions. Each design version 504 has an associated instance of the design fileset 502. In the embodiment of FIG. 9, the design version 504.1A may be a first version of the component 552.1 (and may "represent" or be associated with a design fileset 502.1A), and the design version 504.1B may be a second version of the component 552.1 (and be associated with a design fileset 502.1B). The design version 504.1B may include an edge 901 drawing a dependency reference to the design version 504.1C, and the design version 504.1C may in turn depend on another instance of the component (e.g., a component 552.3 having a design version 504.3B, not shown in the embodiment of FIG. 9). Each component 552 may have a component UID, and each design version 504 may have a design version UID 501 (neither of which are shown in the embodiment of FIG. 9).

In one or more embodiments, extraction of the design fileset 502 associated with the design version 504, for example by the design retrieval subroutine 314 of FIG. 3, includes extraction of all design files on which the design version 504 depends. For example, in FIG. 9 the design fileset 502 associated with the design version 504.1B may include both the design fileset 504.1B and the design fileset 504.2C (which are not shown, but which may be associated with the design version 504.1B and the design version 504.1C, respectively, as noted above).

The design version 504 and/or the component 552 of the design version 504 may include one or more attributes for referencing data relating to testing. As shown in FIG. 9, the design version 504 may reference the test version 708 utilized in testing of the design version 504, the reference made through the database relation 900A. Similarly, the design version 504 may reference the runtime environment data 823 through the database relation 900B, the substrate filesystem 604 utilized in testing through the database relation 900C, the result set 251 (and/or each instance of the result data 252) through the database relation 900D, and the test report 258 generated for a user specified by a user UID 101 through the database relation 900E. The design version 504.1B may also make reference through the database relation 900F to a storage container storing raw data resulting from testing which may include one or more instances of the workspace clone 410, one or more instances of the substrate filesystem clone 406, one or more instances of a runtime instance 415, etc. Each attribute may store a value such as the unique identifier of the element to be referenced (e.g., the filesystem UID 601, a test version UID 701, and/or a UID of a data container storing data such as the runtime environment data 823). Alternatively or in addition, the database relation 900 may be defined in a test record 851 in the test archive database 850 (e.g., by referencing a test UID 801).

One or more instances of the database relations 900 may be instructed to be stored by the certification server 800, for example the test recording routine 814 and/or the retention engine 820. The design version 504.1B and/or each of its dependencies may have stored in one or more attributes a deletion restriction making the design version 504 read-access only, and/or a retention designation that the design version 504.1 should be preferably retained in a database, archived, and/or protected through a 'snapshot' backup, for example due to its association with testing data such that the design version 504.1 can be utilized to reproduce the testing in response to a validation request 813.

Although not shown in the figures, in one or more embodiments the component 752 and test version 708 of FIG. 7 may be stored in a structure similar to the design dependency graph 554 and/or may share similar characteristics as the dependency graph data structure 950 illustrated in FIG. 9. For example, a test version 708 may be modeled as a software component with metadata and/or may be dependent on one or more other test version 708.

Figure 10:
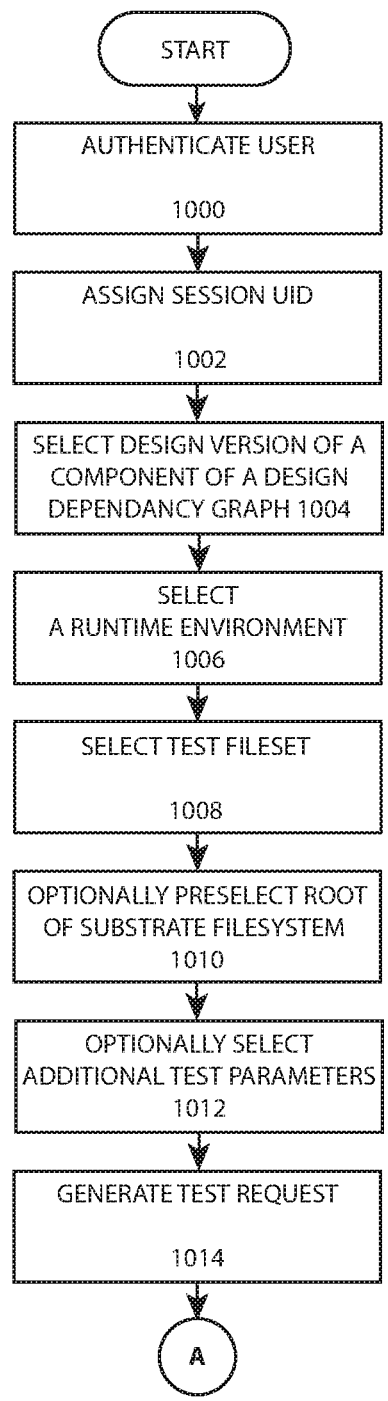
FIG. 10 illustrates a testing initiation process flow for initiating a testing of a design version, including for example to initiate an isolation testing utilizing discrete environments for increased testing efficiency and/or testing accuracy, according to one or more embodiments.

FIG. 10 illustrates a testing initiation process flow 1050, according to one or more embodiments. Operation 1000 authenticates a user (e.g., the user 102) and/or a computing device of the user (e.g., the computing device 100) such as a laptop computer, a desktop computer, a workstation computer running a design software (e.g., the development application 104). Operation 1000 may use multi-factor authentication, including verifying a user's knowledge of a password, possession of a physical thing or device, and/or "possession" of a biometric. Operation 1002 may assign a session identifier to the user 102 and/or the computing device 100. The session identifier may be used to track submission of testing requests 105, testing jobs within the test queue 231, runtime instances 415, result data 252, result sets 251, test report 258, entries in the test archive database 850, and other data related to testing. Operation 1004 may select design version 504 of a component 552 of a design dependency graph 554. The selection may be made through a selection instruction issued by the user (e.g., included within the testing request 105). However, in one or more embodiments, the design dependency graph 554 is not utilized, and operation 1000 may select a design fileset 502 from another location or data structure (e.g., a filesystem in which the design version 504 is stored within a file directory). The design version 504 may be specified through a design version UID 501. The design version 504 and/or the design fileset 502 may also be selected through a graphical user interface that may visualize the nodes and/or edges of the design dependency graph 554.

Operation 1006 selects a runtime environment for testing. The selection may be included within the testing request 105 and/or may be included in an environment initiation instruction 223 generated to initiate a discrete environment 412. Operation 1008 selects a test fileset 706. The selection may also be made by selection of a test version 708 of the test fileset 706. The test version 708 and/or the test fileset 706 may be selected through a graphical user interface. Operation 1010 may optionally select a root 605 of a substrate filesystem 604. Selection may occur, for example, where the test version 708 and/or the test fileset 706 does not include data specifying a type of substrate filesystem 604 that should be utilized in testing. If no selection is made in operation 1010, a default substrate filesystem 604 may be utilized. A testing template may also determine the type of substrate filesystem 604 automatically selected. Operation 1012 optionally selects additional test parameters. For example, parameters may be specified such as data retention requirements, hardware execution requirements (e.g., which may specify which hardware must be utilized by the dissociated test server 400 such as GPUs, hardware encryption modules, machine learning chips, quantum computing infrastructure, etc.), which version of a software framework to run, and how many times for the testing to repeat (e.g., to execute the same instance of the test script 407 three times which may yield three instances of the result data 252 and/or queue the same instance of the test script 707 three times for isolated execution in three separate instances of the discrete environment 412 to yield three instances of the result data 252). Similarly, the test parameters may include which computing cluster to utilize (e.g., a dissociated test server 400A versus a dissociated test server 400B). In one or more embodiments, the test parameters may be selected according to a test template that may be preconfigured to test a certain type of component 552, design version 504, and/or design fileset 502. Operation 1014 generates the testing request 105, which may include the session identifier, and a selection of one or more of the following: the component 552, the design version 504, the design fileset 502, the test version 708, the test fileset 706, the root 605 of the substrate filesystem 604 (and/or another means of specifying the substrate filesystem 604), and/or additional test parameters. Operation 1006 through operation 1014 may be effected, in one or more embodiments, on the computing device 100 in coordination with one or more servers. If generated by the computing device 100, the testing request 105 may be submitted to a server over a network (e.g., over the network 140 to the test orchestration server 200 of FIG. 2). Operation 1014 may end, or may continue to one or more operations of the process flow of FIG. 11.

Figure 11:
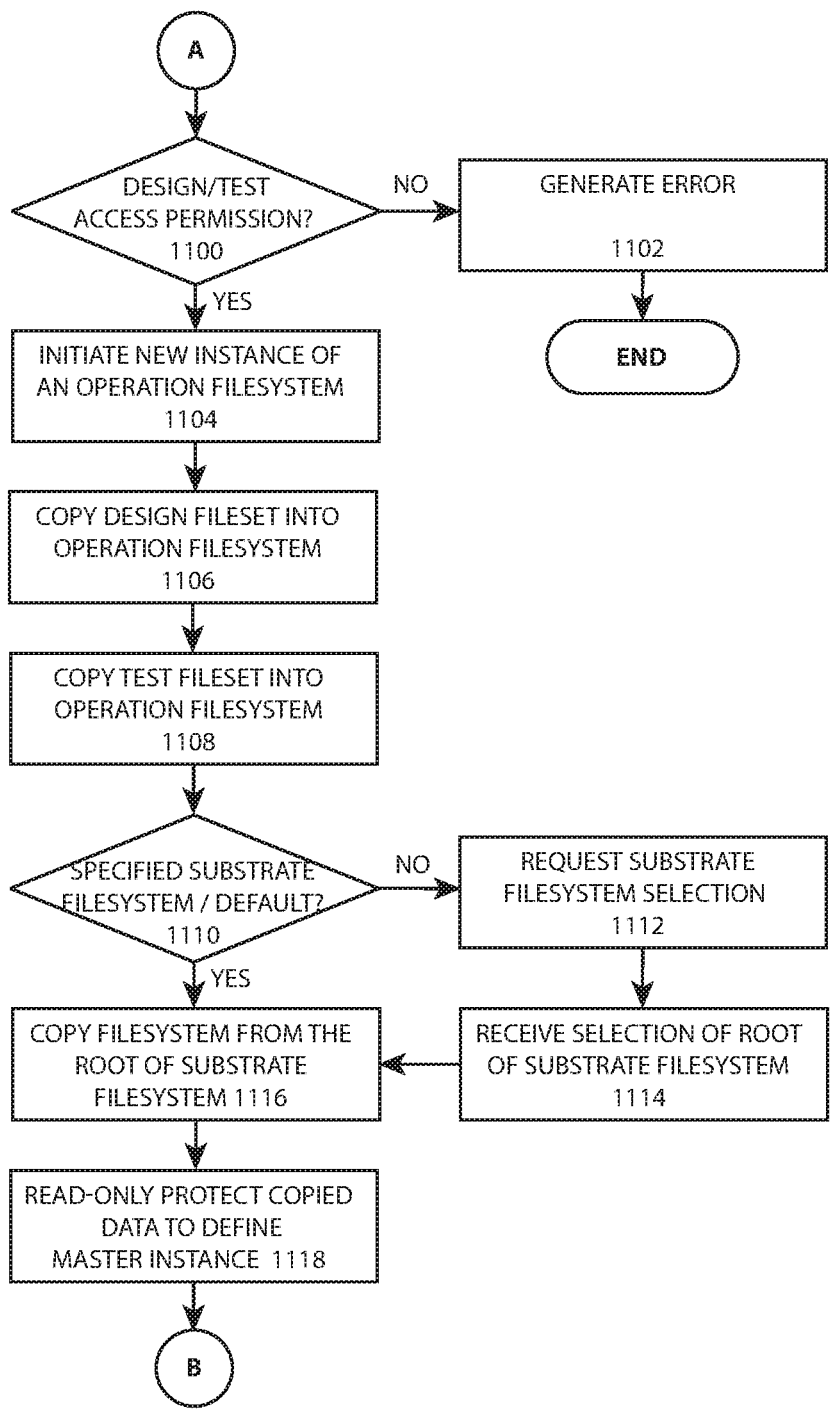
FIG. 11 illustrates a workspace master assembly process flow that may be used to prepare the isolation testing, according to one or more embodiments.

FIG. 11 illustrates a workspace master assembly process flow 1150, according to one or more embodiments. Operation 1100 determines whether the user 102 and/or the computing device (e.g., the computing device 100) is authorized to access the design fileset 502 and/or the test fileset 706. If the user 102 and/or the computing device is not authorized, operation 1100 proceeds to operation 1102 which generates an error which may or may not be reported to the user 102. The error, for example, may generate a log of the event and to generate a message informing the user that they are not authorized and/or generate an error code. Operation 1102 may then end. Although not shown in the embodiment of FIG. 11, partial access to the design fileset 502 and/or the test fileset 706 is possible. For example, where it is determined that the user 102 is authorized to access some but not all of the design files 503 of the design fileset 502, instances of the design files 503 for which the user 102 lacks permission to access may be removed before copying the design fileset 502 into the workspace master 310. Any such modification may be noted in test data and/or in the test record 851. Permission may be based on an access control system and/or a protection table in a database (e.g., the access control system 218 of FIG. 2, a 'p4 protect table' in Perforce®). Where the user and/or the computing device is permitted to access the design fileset 502 and the test fileset 706, operation 1100 may proceed to operation 1104.

Operation 1104 initiates a new instance of an operation filesystem (e.g., the operation filesystem 309 to operate from (e.g., to form a basis for operation of the design fileset 502 and one or more test scripts 707). In one or more embodiments, the operation filesystem (e.g., the operation filesystem 309) may be initiated on the workspace assembly server 300 in the master database 350. Operation 1106 copies the design fileset 502 (e.g., the design fileset 502 of the design version 504 selected in FIG. 10) into the operation filesystem. Similarly, operation 1108 copies the test fileset 706 (e.g., the test fileset 706 of the test version 708 selected in FIG. 10) into the operation filesystem. In one or more embodiments, the design fileset 502 may be copied from the design server 500, and the test fileset 706 may be copied from the test storage server 700. The copy operation of the design fileset 502 and/or the test fileset 706 into the operation filesystem may be implemented as a 'checkout' of the software code or other design file. The copy operations of operation 1106 and operation 1108 may also clone and then read-only protect the design fileset 502 and the test fileset 706 to implement a copy-on-write data structure (e.g., within the design database 550 and the test database 750, respectively) for the purpose of assembling the workspace master 310.

Operation 1110 determines whether a substrate filesystem (e.g., the substrate filesystem 604) was specified, for instance in operation 1010 of FIG. 10 and/or determines whether a default instance of the substrate filesystem 604 is specified (e.g., in metadata of the design version 504, or as a general default usable where none is specified). Where no substrate filesystem 604 is specified and/or no default instance of the substrate filesystem 604 is specified, operation 1110 proceeds to operation 1112, which may request a selection of the substrate filesystem 604 (e.g., from the user). Operation 1114 may then receive a selection of a root 605 of the substrate filesystem 604. If a substrate filesystem is determined to be specified in operation 1110 (or subsequently specified in operation 1114), operation 1116 copies the substrate filesystem 604 that was specified (e.g., to use as a master instance). The copy operation of operation 1116 may also clone and then read-only protect the substrate filesystem 604 (e.g., within the filesystem storage 650) for the purpose of assembling the workspace master 310. In one or more embodiments, the operation filesystem 309 initiated in operation 1104, the design fileset 502 copied in operation 1106, the test fileset 706 copied in operation 1106, and/or the substrate filesystem 604 copied in operation 1116 may be copied into the master database 350 of the workspace assembly server 300 of FIG. 3. The design fileset 502 and the test fileset 706 stored within the operation filesystem 309 may together define a workspace data.

Operation 1118 read-only protects data copied in operation 1106, operation 1108, and/or operation 1116 to define a master instance (e.g., the workspace master 310). The read-only protection may initiate a copy-on-write data structure and process for any future modifications related to the copied data. For example, the workspace data may be read-only protected to define the workspace master 310, and the substrate filesystem 604 may be read-only protected to define the master instance of the substrate filesystem 604 as shown and described in the embodiment of FIG. 3. Where the workspace data has been cloned in operation 1106, the operation 1108, and/or the operation 1118, the clones comprising the master instance may be read-only protected. Operation 1118 may then terminate, or may proceed to one or more operations in the process flow of FIG. 12.

Figure 12:
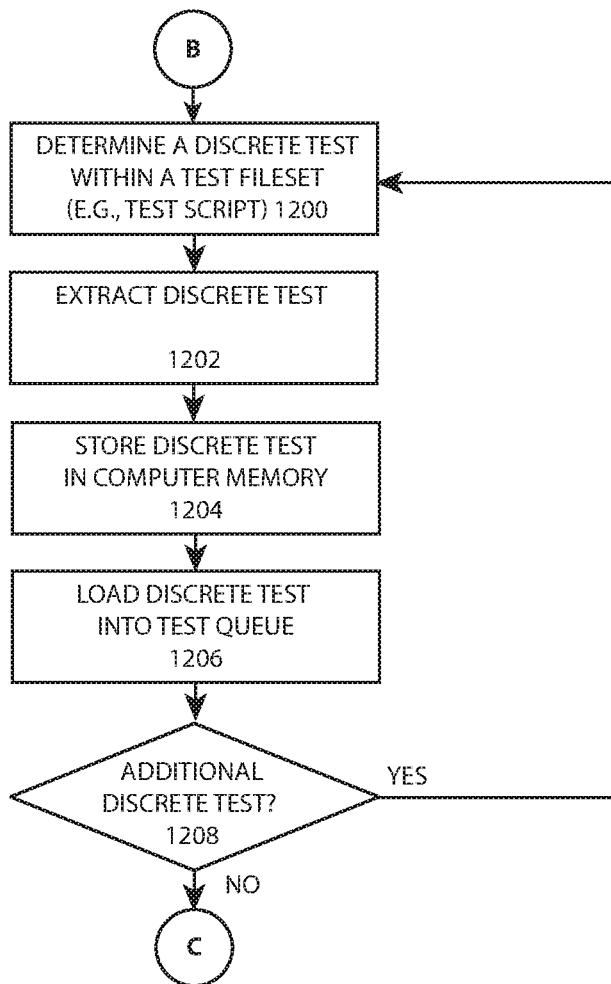
FIG. 12 illustrates a test fractionation process flow, including fragmenting a test fileset into one or more test scripts for assignment to discrete environments to carry out the isolation testing, according to one or more embodiments.

FIG. 12 illustrates a test fractionation process flow 1250, according to one or more embodiments. Operation 1200 determines a discrete instance of a test (e.g., a test script 707, one or more interdependent or related instances of the test scripts 707) within a test fileset (e.g., the test fileset 706). A discrete instance of the test may be identified through a variety of methods. In one or more embodiments, the discrete test may be identified because the discrete test is stored as a separate file and/or distinct executable in a directory. For example, each instance of the test script 707A through the test script 707N may be a Linux ELF executable. However, in a different example, the test fileset 706 may include a single file storing a block of software code. The block of software code may have non-executable comments and/or other coded signals written into the software code that may delineate the discrete instances of the test.

Operation 1202 extracts the discrete test from the design fileset 502, and operation 1204 stores the discrete test in a computer memory (e.g., RAM). Operation 1206 loads the discrete test into a test queue (e.g., the test queue 231 of FIG. 2). Operation 1202 may additionally associate any tracking information to the discrete test loaded into the queue (e.g., the session identifier, the user UID of the user submitting the testing request 105, etc). Operation 1208 may then determine whether there is another instance of the discrete test (e.g., another instance of a test script 707) within the test fileset 706. If a next instance of the discrete test is identified, operation 1208 returns to operation 1200 which then determines the next instance of the discrete test for extraction. If no additional discrete test is determined, operation 1208 may terminate or may proceed to one or more operations of FIG. 13. In one or more embodiments, each test script 407 may be loaded into the test queue 231 and/or executed in an order of anticipated execution time, for example by reference to previously recorded execution times of the test script 707 (e.g., previously recorded in a database, as metadata of the test fileset 706, etc.), and/or by analyzing the structure or other features of the test script 407 and/or the test fileset 706. In one or more embodiments, the test fractionation routine 228 and additional software and/or hardware elements of the test orchestration server 200 may effect the operation 1200 through the operation 1208.

Figure 13:
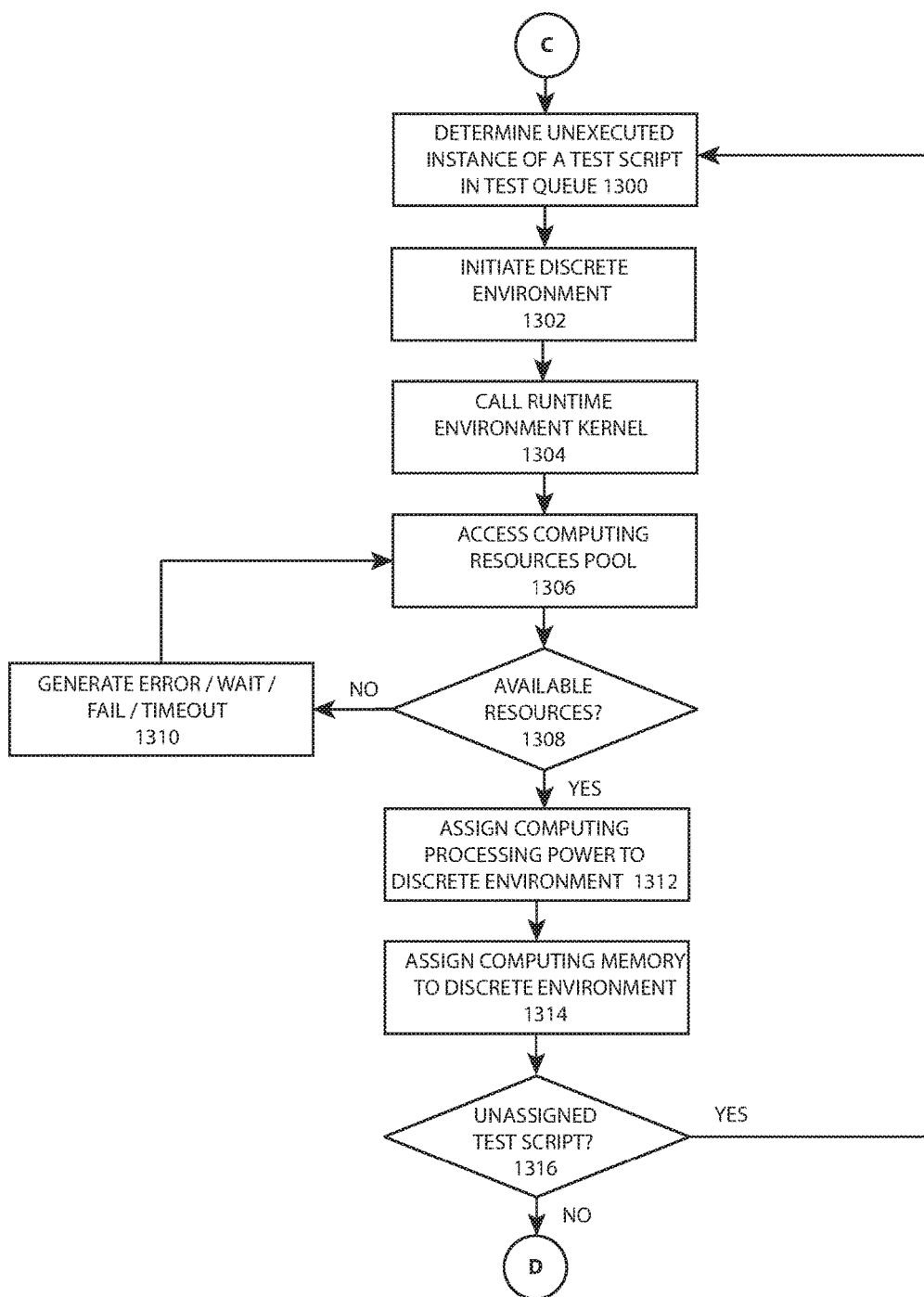
FIG. 13 illustrates a computing resource allocation process flow that may be used to schedule and/or dynamically allocate computing resources, including computing power and memory to each of the one or more discrete environments, according to one or more embodiments.

FIG. 13 illustrates a computing resource allocation process flow 1350, according to one or more embodiments. Operation 1300 determines an unexecuted instance of a test script 707. The unexecuted instance may be determined through tracking (e.g., in a database) which instances of the test script 707 have been assigned to and/or cloned into a discrete environment 412 for execution. Operation 1302 initiates a discrete environment 412. The discrete environment 412 may be initiated and/or executed on the same computing device and/or server as the test queue 231. Alternatively or in addition, initiation of the discrete environment 412 may originate in a server storing the test queue 231 (e.g., the test orchestration server 200) which may transmit initiation instructions to a different server for execution of the discrete environment 412 (e.g., the dissociated test server 400). Operation 1302 may be effected by the generation, transmission, receipt, and/or processing of the environment initiation instruction 223, as shown and described in the embodiment of FIG. 2. Each instance of the discrete environment 412, its assigned instance of the test script 707, and its result data 252, may be tracked through the session identifier, user UID, and/or other tracking methods as may be known in the art.

Operation 1304 calls a runtime environment kernel of an operating system on which the discrete environment 412 will run (e.g., the kernel 496 of FIG. 4). For example, the call may be a command such as made through the syscall interface (e.g., "execve( )"). Operation 1306 accesses a computing resources pool (e.g., the computing resources pool 499). Required computing resources may be automatically assigned to each discrete environment 412, may be a parameter determined by the user 102 (e.g., in operation 1012 of FIG. 10), may be looked up in a table or other database based on previous execution times or metrics, and/or or may be inferred from the type, size, complexity, or another characteristic of the design fileset 502 and/or test script 707 that is to be executed.

Operation 1308 is a decision operation determining whether there are available computing resources (e.g., within the computing resources pool 499) to provision the discrete environment 412 for execution. In the case of a computing container (e.g., the container 413 of FIG. 4), each instance of the discrete environment 412 may be allocated requested resources such as virtual memory (e.g., assignment of the virtual memory 497 as an example of the memory allocation 493), CPU cycles (e.g., as an example of the processing power allocation 491) through the kernel (e.g., the kernel 496), and/or networking buffers. In the case of a virtual computer, each instance of the discrete environment 412 may be allocated, similarly, virtual memory, CPU cycles through a hypervisor, and/or networking buffers. Where no resources are available (e.g., the computing resources pool 499 is currently in use), operation 1308 may proceed to operation 1310 which may generate an error, wait a period of time before again attempting to access the computing resources pool, fail, and/or timeout such that the use may be required to re-submit the testing request 105, and/or otherwise fail.

Where computing resources are available, operation 1308 proceeds to operation 1312, which assigns computing processing power to the discrete environment 412 (e.g., the processing power allocation 491 of FIG. 4) and operation 1314 which assigns computing memory to the discrete environment 412 (e.g., the memory allocation 493 of FIG. 4). Once provisioned, the discrete environment 412 may be prepared to receive a copy and/or a clone of the workspace data, may be mounted to a substrate filesystem 604, and then prepared for execution of the discrete test. Operation 1316 is a decision operation that determines if there are one or more unassigned instances of the test script 707 within the test queue (e.g., the test queue 231). If an unexecuted instance of the test script 707 is unassigned to an instance of the discrete environment 412, operation 1316 returns to operation 1300 which may begin the initiation of a new instance of the discrete environment 412 for the unexecuted instance of the test script 707. Otherwise, if all instances of the test script 707 may have been withdrawn from the queue, operation 1316 may terminate or may proceed to one or more operations of the embodiment of FIG. 14. Even in such case that an unassigned test script (e.g., a test script 707B) is determined to be present within the test queue 231, the assigned test script (e.g., a test script 707A assigned to a discrete environment 412A) may continue toward execution without regard for the unassigned test script. Thus, the embodiment of FIG. 13 may enable the testing associated with one or more test scripts 707 of a test fileset 706 to proceed piecemeal and in parallel as computing resources become available.

Figure 14:
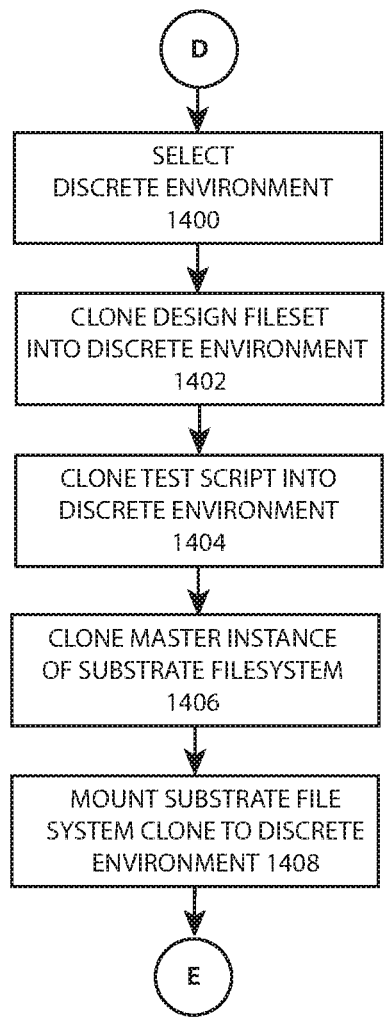
FIG. 14 illustrates a workspace dissociation process flow which may be utilized to clone the workspace master and/or the substrate filesystem into one or more clones, each assigned to one of the one or more discrete environments, according to one or more embodiments.

FIG. 14 is a workspace dissociation process flow 1450, according to one or more embodiments. Operation 1400 selects a discrete environment 412 (e.g., a discrete environment 412 provisioned with computing resources in the embodiment of FIG. 13). Operation 1402 clones a design fileset 502 into the discrete environment 412 (e.g., to define the design fileset clone 402 stored in an operation filesystem clone 409 of FIG. 4). Operation 1404 clones a test script 707 into the discrete environment 412 (e.g., to define the test script 407 stored in the operation filesystem clone 409 of FIG. 4). The combination of the design fileset clone 402 and the test script 407 may define the workspace clone 410. Operation 1406 may clone the master instance of the substrate filesystem 604 (e.g., to define the substrate filesystem clone 406 of FIG. 4). Operation 1408 may then mount the substrate filesystem clone 406 to the discrete environment 412, such that the test script 407 may operate on the substrate filesystem clone 406 when executing to perform the test associated with the test script 407. Operation 1408 may then terminate, or may proceed to one or more operations of the embodiment of FIG. 15. In one or more embodiments, operation 1400 through operation 1408 may be effected by the cloning engine 240 of FIG. 2.

Figure 15:
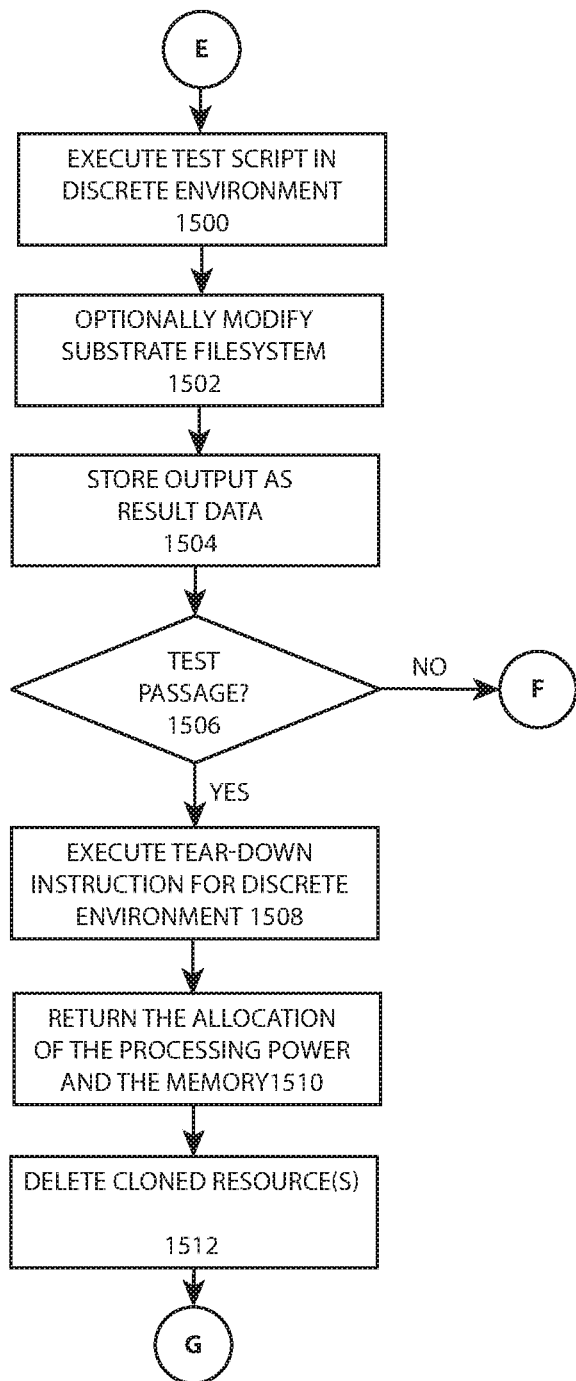
FIG. 15 illustrates a dissociated execution process flow for isolated execution of the one or more test scripts within the one or more discrete environments to generate the result data of the testing, according to one or more embodiments.

FIG. 15 illustrates a dissociated execution process flow 1550, according to one or more embodiments. Operation 1500 executes the test script 707 in the discrete environment 412 (e.g., on one or more processors 490 and according to the processing power allocation 491 of FIG. 4). Operation 1500 may be initiated through the environment execution instruction 249, which may be included within the environment initiation instruction. Operation 1502 optionally modifies the substrate filesystem clone 406 in response to execution of the test script 707. In one or more embodiments, the test script 707 and/or a processor executing the test script 707 carries out operation 1502. Operation 1504 stores an output of execution of the test script 707 (e.g., in the memory 492, the storage 494, the result capture database 250, etc.) as the result data 252. The result data 252 may comprise one or more log files, a text file, a stack trace, and/or other forms of data output. For example, where the test script 707 is a bash shell script testing whether an estimated hardware power usage is below a certain value, the result data 252 may be a text file with data comprising the simulation record of the test as well as an active estimated power value.

Operation 1506 is a decision operation that determines whether the test passed based on a criteria. The evaluation may determine within the discrete environment 412 (e.g., based on criteria provided by the test evaluation routine 256 of FIG. 2) and/or through real-time or asynchronous external evaluation of the result data 252 (e.g., by the test evaluation routine 256). Upon determination of a test passage (e.g., the test passage 253), operation 1506 may proceed to operation 1508. A test passage may be based on, for example, the successful execution of one or more instances of the design fileset 502 without an error, the modification of the substrate filesystem clone 406 without an error, the performance of a computing task meeting or exceeding a performance metric, and/or other criteria. Upon determination of a test failure (e.g., the test failure 254), or upon another indeterminate result, operation 1506 may proceed to one or more operations of the process flow of FIG. 17. In one or more alternative embodiments, operation 1506 may proceed to operation 1508 regardless of the outcome of the test.

Operation 1508 may execute a tear-down instruction (e.g., the tear-down instruction 227) for the discrete environment 412. The tear-down instruction 227 may be a conditional instruction provided along with the environment initiation instruction 223 (e.g., issued by the environment manager 220 of FIG. 2) and/or may be issued by an external system following completion of the test script 707 (e.g., issued by the environment manager 220 in response to evaluation of the result data 252). Operation 1510 returns the allocation of the processing power (e.g., the processing power allocation 491 of FIG. 4) and the allocation of the memory (e.g., the allocation of the memory 492 of FIG. 4) to the computing resources pool (e.g., the computing resources pool 499). Operation 1512 may then delete any cloned resources associated with the discrete environment 412, including the workspace clone 410 and/or the substrate filesystem clone 406. In operation 1512, the deletion may also be effected by designating the cloned resources for deletion (e.g., by another system, filesystem system management application 612, and/or database management application 512). Operation 1512 may then terminate, or may proceed to one or more operations of the process flow of FIG. 16.

FIG. 16 illustrates a report generation process flow 1650, according to one or more embodiments. Operation 1600 checks the result set (e.g., the result set 251) for completion, for example in a storage location such as the result capture database 250. Operation 1602 is a decision operation determining whether all instances of the result data 252 of the result set 251 have been recorded. In one or more embodiments, the result set 251 may be complete when it includes at least one instance of the result data 252 for each instance of the discrete test (e.g., the test script 407) executed in a discrete environment 412. If the result set 251 is not complete, operation 1602 may proceed to operation 1604 to wait a period of time (e.g., 1 second, 5 seconds, 1 minute, 1 hour) before returning to operation 1600. Otherwise, operation 1602 may proceed to operation 1606 which may associate the test version 708 with the design version 504 (e.g., as shown and described as the database reference 900A of FIG. 9 and/or in the test archive database 850). Operation 1608 may store the result set 251 in a data container and associate the data container storing the result set 251 with the design version 504 (e.g., as shown and described through the database relation 900D). For example, operation 1608 may remove the result set 251 from what may be relatively short term storage of the result capture database (e.g., if implemented in volatile memory using a key-value store such as Redis®) and place the result set 251 in what may be long term storage (e.g., on disk in a NAS system storing the test archive database 850). Additional information may be stored, for example a time of the testing, a user UID 101 of a user 102 requesting the testing, etc. The design version 504 and/or the test version 706 may also be associated through a database (e.g., the test archive database 850) which may log the testing and/or track the testing. Such database association may occur distinctly from a storage location of the design fileset 502, the design dependency graph 554, the test fileset 706, and/or the test dependency graph 752. Optionally, the design version 504 and/or the test version 706 may be designated for retention upon occurrence of the first testing of the design fileset 502 of the design version 504, as shown and described below.

Operation 1610 may generate a test report 258 that may emphasize human readability of testing results. For example, the test report 258 may include a summary of the testing and/or the result set 251 and may be in the form of a document format (e.g., a PDF file), spreadsheet (e.g., an Excel® file), and/or other data format. Operation 1612 may then transmit the test report 258 and/or the result set 251 to the user 102 and/or the computing device of the user (e.g., the computing device 100) over the network (e.g., the network 140). Operation 1612 may determine a network address or other location for delivery based on a session identifier or other tracking data.

Figure 17:
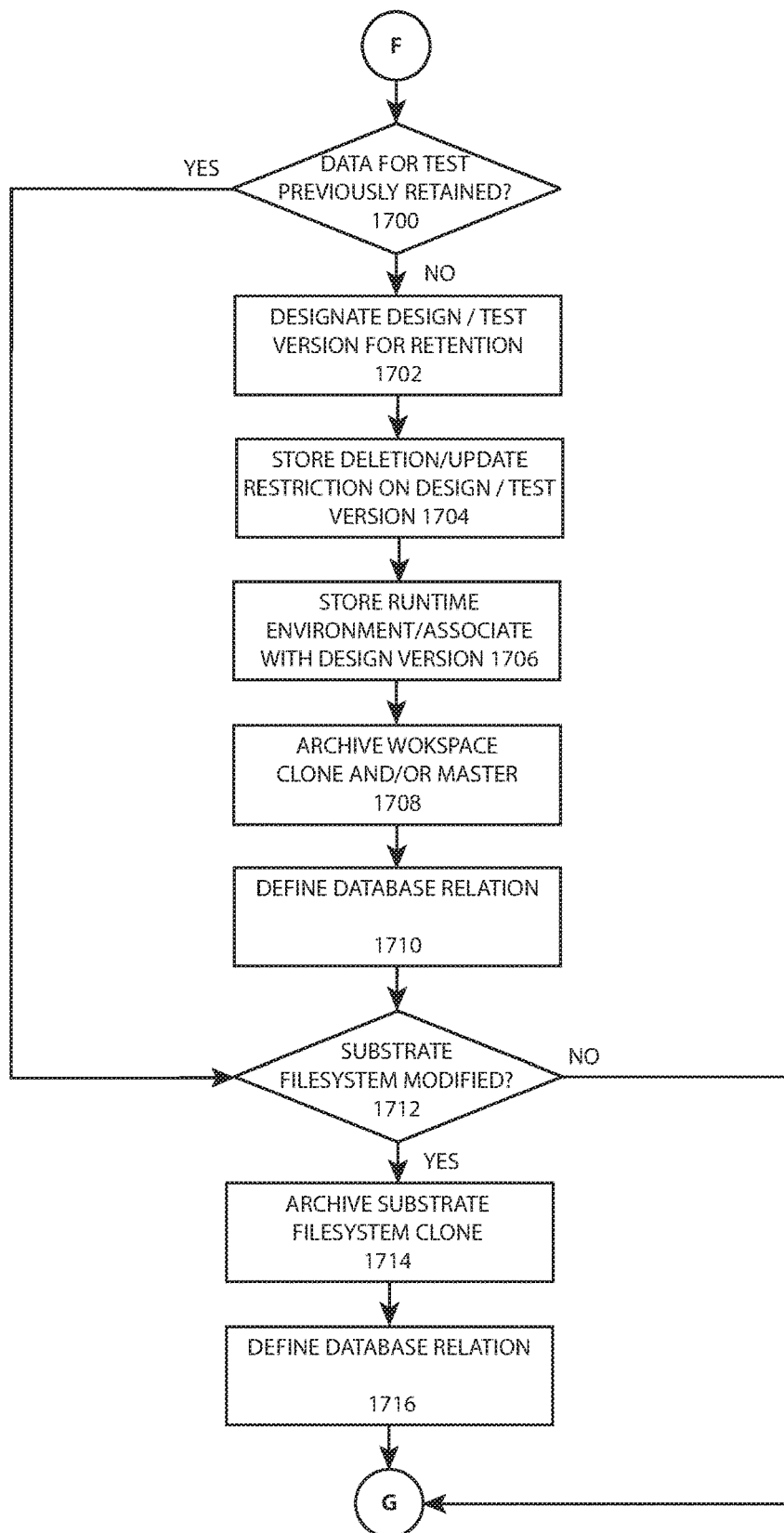
FIG. 17 illustrates an audit retention process flow for storing test results and other test data, including but not limited to dissociated testing results, substrate filesystem modifications, and/or runtime environment data, according to one or more embodiments.

FIG. 17 illustrates an audit retention process flow 1750, according to one or more embodiments. In one or more embodiments, the process flow of FIG. 17 may be utilized to retain more detailed data related to testing than may be recorded in operation 1606 and/or operation 1608. Operation 1700 may determine whether retention data related to the testing has previously been stored (e.g., a test failure 254 already occurred resulting in data retention as shown and described herein). If retention data related to the testing has previously been stored, operation 1700 may advance to operation 1712. Operation 1702 designates the design version 504 of the design fileset 502 and/or the test version 708 of the test fileset 706 for retention in a database (e.g., the design database 550, the test database 750). Operation 1704 stores a deletion restriction (which may also be referred to as a update restriction) on the design version 504, the design fileset 502, the test version 708, and/or the test fileset 706. Operation 1706 stores a runtime environment data (e.g., the runtime environment data 823) and may associate the runtime environment data with the design version 504 (e.g., through the database relation 900A).

Operation 1708 optionally stores the workspace clone 410 associated with the result data 252 having the associated test failure 254. Operation 1710 stores a database relation associating the design version 504 and a data container storing the workspace clone 410 and/or the workspace master 310. Operation 1712 may also store the workspace master 310 and/or mark the workspace master for retention such that the workspace clone 410 may be promoted to a full copy. Operation 1712 determines if the substrate filesystem 604 was modified by the test script 707 (and/or failed to be modified where modification was required for a test passage 253. If modification occurred (and/or no modification occurred but was required for the test passage 253), operation 1712 may proceed to operation 1714 which may store the substrate filesystem clone 406. Operation 1714 may also store the master instance of the substrate filesystem 604, e.g., to permit re-constitution and/or promotion of the substrate filesystem clone 406 to a full copy. Operation 1716 stores a database relation (e.g., the database relation 900 of FIG. 9) between the design version 504 and a data container of the substrate filesystem clone 406 and/or the master instance of the substrate filesystem 604. Operation 1716 may then terminate, or may proceed to one or more operations of the process flow of FIG. 16.

Figure 18:
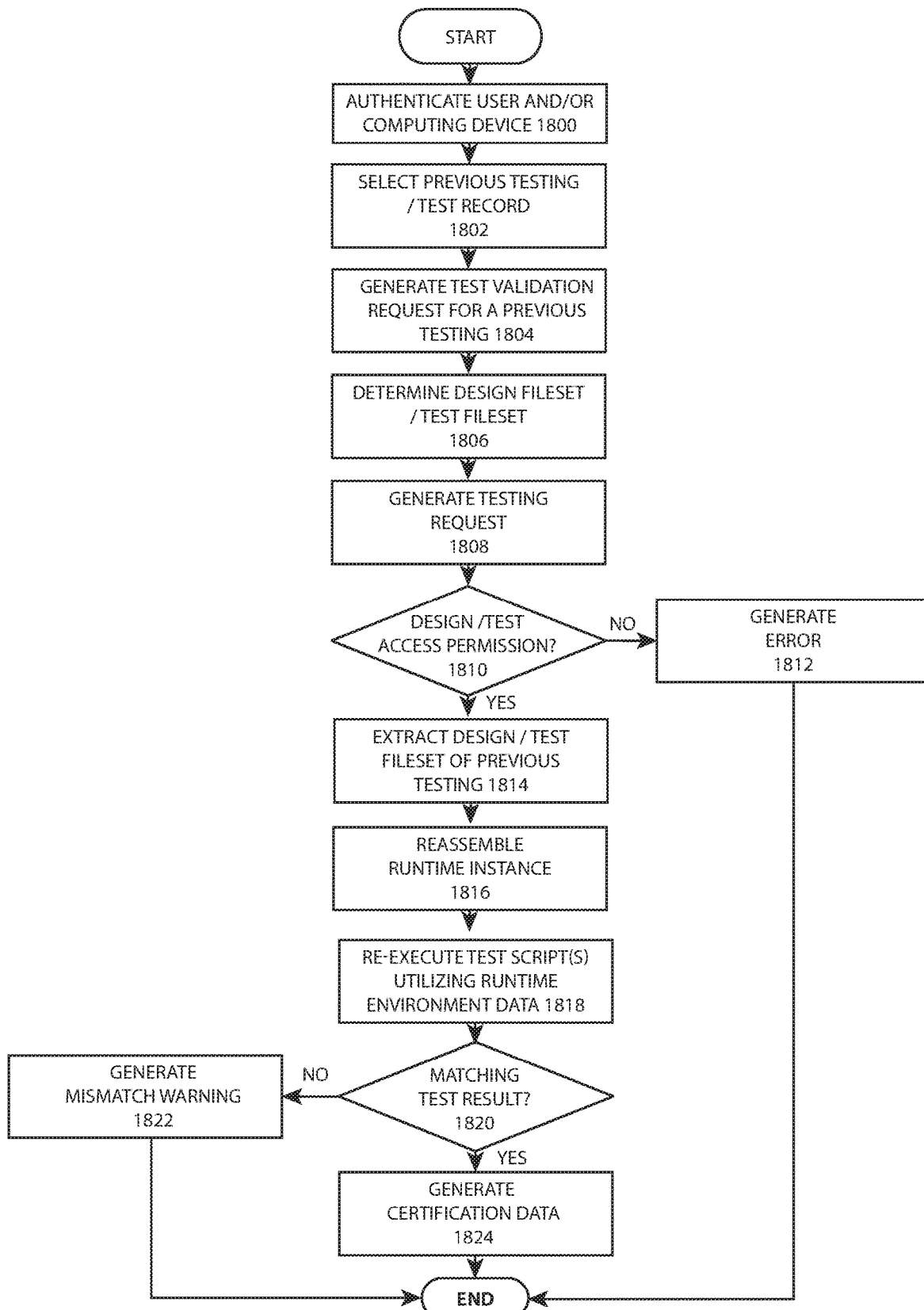
FIG. 18 illustrates a test recreation certification process flow which may be utilized to re-create a testing, including for example to prove a previous testing occurred and/or that a re-testing generates a similar or identical result, according to one or more embodiments.

FIG. 18 illustrates a test recreation certification process 1850, according to one or more embodiments. Operation 1800 authenticates a user (e.g., the user 102) and/or a computing device of the user (e.g., the computing device 100). Operation 1800 may be carried out similarly to operation 1000 of FIG. 10. Operation 1802 selects a previous testing to be reproduced. For example, the user may use the design audit interface 812 to select the previous testing. Previous testing may be identified and selected through data stored in attributes of the design version 504 node of a design dependency graph 554 data structure and/or through a separate database tracking and/or logging design testing (e.g., selection of a test record 851 in the test archive database 850). In one or more embodiment, the audit and/or request for reproducibility may be directed toward reproducing errors, including proving an error is reproducible. The reproducibility test may also be used to vary conditions gradually to assist in identifying errors, for example varying single variables of the runtime environment such as operating system version.

Operation 1804 generates a test validation request (e.g., the test validation request 813), which may be a request to validate one or more aspects of testing of a design version 504 and/or a design fileset 502. In the embodiment of FIG. 10, the test validation request 813 may specifically be a request to validate reproducibility of a previous testing of the design version 504 of the design fileset 502. The test validation request 813 may be submitted through the computing device 100 and/or through one or more other computing devices that may be in communication with the design audit interface 812 of FIG. 8 through the network 140. The test validation request 813 may include a selection of the design version 504 and/or the design fileset 502, and may further select one or more previous testings that have been conducted on the design version 504 and/or the design fileset 502. Operation 1806 determines, the following conditions associated with the previous testing: (i) the design fileset 502 and/or the design version 504 of the previous testing, and/or (ii) the test fileset 706 and/or the test version 708 of the previous testing. Operation 1808 generates a testing request based on data and/or parameters of the previous testing of the design version 504 and/or the design fileset 502. The testing request includes data that specifies: (i) the design fileset 502 and/or the design version 504, and (ii) the test fileset 706 and the test version 708.

Operation 1810 determines whether the user 102 and/or the computing device is authorized to access the design fileset 502, the design version 504, the test fileset 706, the test version 708, and/or other data that may be required to reproduce the previous testing (which may be stored as metadata of one or more nodes of the design dependency graph 554 or as data of the test record 851 within the test archive database 850). If the user and/or the computing device is not authorized, operation 1810 may proceed to operation 1812 which may generate an error. Otherwise, operation 1810 may proceed to operation 1814.

Operation 1814 extracts the design fileset 502 from the design version 504 (e.g., from the design database 550 of FIG. 5), and the test fileset 706 (e.g., from the test database 750 of FIG. 7). Operation 1816 reassembles the runtime instance (e.g., the runtime instance 415 of FIG. 4) including setup to match the runtime environment data 823 associated with the previous testing (e.g., by following the database relation 900B in FIG. 9 associated with the design version 504). Operation 1818 then re-executes each test script 707 of the test fileset 706 to generate a result data 252 and/or a result set 251 of the validation testing. In one or more embodiments, operation 1816 may be effected through generation of a workspace master 310 and cloning into one or more discrete environments 412, as shown and described in FIG. 11 through FIG. 14. In one or more other embodiments, the runtime instance may be built and executed according to a separate process and/or may not utilize the discrete environments 412 and/or the isolation testing. In one or more embodiments, operation 1818 may re-execute one or more test scripts 707 according to the process flow of FIG. 15.

Operation 1820 determines whether there is a match between one or more instances of the result data 252 of the previous testing and one of more of the result data 252 of the validation testing. Where no match occurs, operation 1820 may proceed to operation 1822 which may generate an error notifying the user and/or logging that the testing could not be reproduced, or otherwise cataloging the lack of reproducibility (e.g., a list of tests and/or test scripts 707 which failed to be reproduced). Otherwise, where results match, operation 1820 may proceed to operation 1824. Operation 1824 may generate a certification data that may be a message for transmission to the user 102, the computing device 100, and/or another computer that the testing was reproducible.

Figure 19:
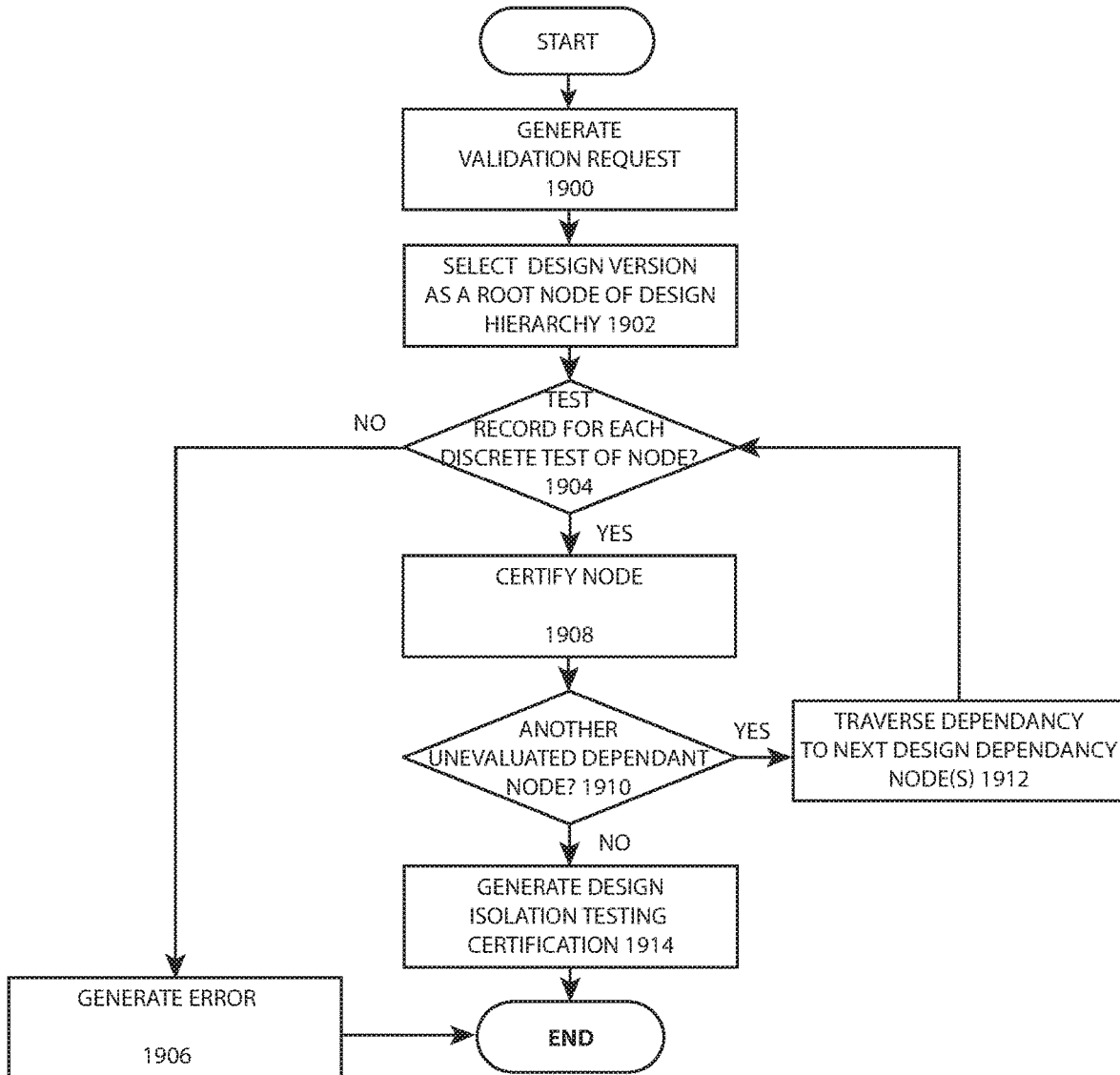
FIG. 19 illustrates a test isolation certification process flow which may be utilized to prove an isolation testing was completed on a design version of a component and/or one or more design dependencies of the design version, according to one or more embodiments.

FIG. 19 illustrates a test isolation certification process flow 1950, according to one or more embodiments. Operation 1900 generates a validation request (e.g., a validation request 813), where the validation request is specifically a request to validate an isolation testing of a design version 504 and/or a design fileset 502. The isolation testing may be a testing of a design fileset 502 whereby each test script 707 of a test fileset 706 utilized in the testing is executed in a separate instance of the discrete environment (e.g., a computing container, a virtual computer) and optionally modifies a separate instance of the substrate filesystem (e.g., a substrate filesystem to be operated on). Operation 1902 selects a design version 504 stored as a node of a design dependency hierarchy (e.g., a design dependency graph 554). A first instance of the design version 504 selected may act as a root node of the isolation testing validation (not to be confused with the root 605 of FIG. 6). The design dependency graph 554 may be a design dependency hierarchy and/or a directed acyclic graph in which designs are modeled as components (e.g., the component 552 of FIG. 9) which may incorporate sub-components and/or which may be incorporated as a sub-component (in both such cases, defining one or more dependencies within the design dependency graph). Operation 1904 determines whether a test record of isolation testing has been stored in association with the node. In one or more embodiments, the node may have one or more attributes with values specifying test data, or test data may be stored in one or more additional databases (e.g., the test record 851 stored in the test archive database 850). Alternatively or in addition, operation 1902 may examine one or more instances of the test results 252 and/or the test report 258 associated with the node to verify that isolation testing occurred (e.g., determining that there are both 'N' test scripts 707 in the test fileset 706 and the result set 251 comprises 'N' instances of the result data 252 each generated by an instance of the discrete environment 412). Where no test record 851 is found associated with the node (e.g., the design version 504 in the design dependency graph 554), and/or isolation testing cannot otherwise be provably established through stored data such as the result set 251 and/or the test report 258, then operation 1904 may proceed to operation 1906 which generates an error. Where isolation testing of the node (e.g., the design version 504) is determined to have occurred, operation 1904 may proceed to operation 1908 which certifies the node for having completed the isolation testing. Data specifying the certification generated by operation 1908 may be stored pending the determination that all nodes in a dependency chain from the root have undergone isolation testing.

Operation 1910 determines whether one or more other nodes within the design dependency graph 554 (e.g., other instances of the design version 504) depend on the node most recently evaluated in operation 1904. If additional unexamined nodes are dependent on the node most recently examined in operation 1904, then operation 1910 proceeds to operation 1912 which traverses the dependency to a next node (e.g., a next instance of the design version 504B in the design dependency graph 554) and then returns to operation 1904 for evaluation of the next node. The loop comprised of the operation 1904, the operation 1908, the operation 1910, and/or the operation 1920 may continue until each dependency of the root node, connected through any number of edges (e.g., edges 901), is evaluated. Once all nodes traceable back to the root node are evaluated (and assuming each is determined to have undergone discrete testing by operation 1904), operation 1910 proceeds to operation 1914 which generates a design isolation testing certification data which may be communicated to the user, the computing device 100, and/or another computer.

Figure 20:
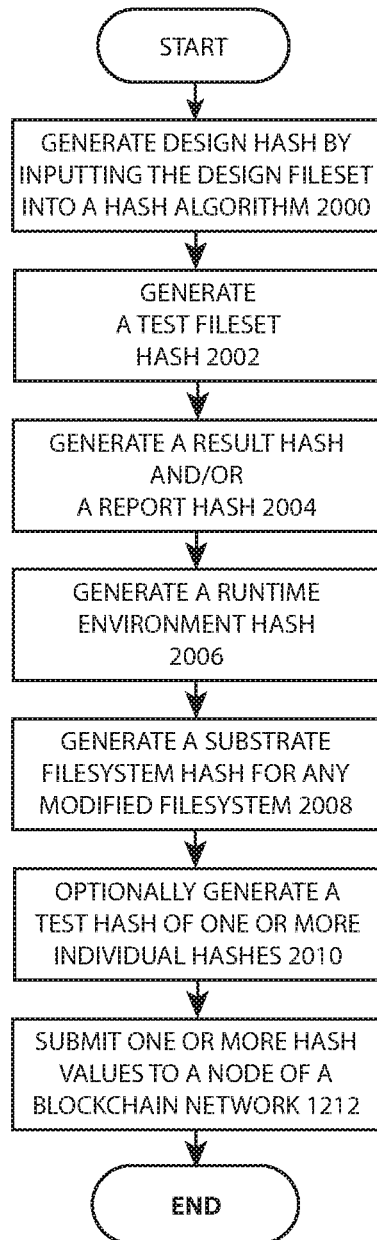
FIG. 20 illustrates a blockchain storage process flow for immutably recording the results of a testing in a blockchain data structure for subsequent auditability, according to one or more embodiments.

FIG. 20 is a blockchain storage process flow 2050, according to one or more embodiments. The process flow of FIG. 20 may be utilized to immutably protect data related to testing, including but not limited to data utilized for validation. Operation 2000 generates a design hash value by inputting the design fileset 502 into a hash algorithm (e.g., SHA-256, SHA-2). In one or more embodiments, the design fileset 502 may have already been designated for retention and/or read-only protected, but the design hash value may further provide an advantage in that, when independently stored from the design fileset 502, the design hash value may be used to prove that the design fileset 502 has not, in fact, undergone modification since the design hash value was generated. Alternatively, if the design fileset 502 is too large and/or may be computationally expensive to hash, additional aspects of the design fileset 502 and/or metadata of the design version 504 may be hashed (e.g., each file name of each design file 503). Similarly to operation 2000, operation 2002 may generate a test fileset hash.

Operation 2004 may generate a result hash value by hashing the result set 251 and/or one or more instances of the result data 252. Alternatively, or in addition, operation 2004 may generate the result hash value by hashing the test report 258. Operation 2006 may generate a runtime environment hash by inputting the runtime environment data 823 into the hash algorithm and returning the output. Operation 2008 may hash the substrate filesystem 604, including optionally any retained modified instance of the substrate filesystem (e.g., the substrate filesystem clone 406), resulting in output of a substrate filesystem hash value. Where several individual hash values have been generated, operation 2010 may optionally consolidate such individual hash values into a single hash value (e.g., forming a hash chain) by inputting one or more of the individual hash values (e.g., the design hash value, the test fileset hash value, the result hash value, the report hash value, the runtime environment hash value, and/or the substrate filesystem hash value) into the hash function to generate what may be referred to herein as a "test hash value". In operation 1212, any of the one or more hash values generated in the embodiment of FIG. 20 may be submitted in a blockchain transaction protocol to a distributed ledger blockchain (e.g., to a node receiving and processing transactions) for incorporation into a block of the blockchain data structure.

The blockchain data structure may be implemented with a "private" or "consortium" blockchain that is a distributed database ledger having permissioned network nodes operated by one or more private parties and reconciled with a consensus mechanism (e.g., Byzantine fault tolerance). The blockchain data structure may also be implemented with a public blockchain that is a distributed database ledger having non-permissioned (which may be known as a "permissionless" ledger) network nodes reconciled with a consensus mechanism such as proof-of-work, proof-of-stake, proof-of-use, etc. The transaction may be plaintext and/or may be encrypted such that only the party submitting the transaction, and any third party provided with encryption keys, is able to decrypt and evaluate the blockchain transaction.

In one or more alternate embodiments, raw data may also be directly communicated to the blockchain network for storage, to prove testing occurred, and/or to store an immutable record of testing. For example, the blockchain transaction may include the design version UID 501 of the design version 504 tested, the test version UID 701 of the test version 708 tested, a timestamp, a user UID 101 of a user 102 running the testing, and/or a report hash value of the test report 258. In one or more embodiments, as part of resolving a validation request 813, one or more of the hash values may be calculated and compared (e.g., comparison to those stored in the blockchain data structure) to certify that no data alteration has occurred.

An example embodiment will now be described. AutoCar (the "Company") is a software development company that builds software for piloting autonomous vehicles such as cars, trucks, and forklifts. AutoOS is licensed to auto manufacturers that incorporate the software into vehicles to enable autonomous driving capability. The Company has hundreds of software developers, including for example software designers, architects, and engineers (e.g., instances of the user 102). Many software developers may be working on the Company's software at any given time, and sometimes tens or hundreds on the same software component. The software developers often work on computer workstations (e.g., the computing device 100 running the development application 104)

The software may be relatively complex. For example, the core autonomous operating system software which pilots an autonomous vehicle (which the Company calls "AutoOS") may depend on many smaller software components, application programming interfaces (APIs), external services, hardware components (e.g., LIDAR input data) and third-party software libraries. The software may be used or deployed in different types of computing systems that are used by different car manufacturers. Each computing system may have a distinct execution environment and/or runtime environment. For example, some customers of the Company may wish to deploy the Company's software on standard Linux distribution, while others may wish to deploy the software on a customized Linux distribution.

The Company stores its software code on a server in a data repository (e.g., on the design server 500 in the design database 550). Each software design has a set of design files (e.g., the design fileset 502), and the design files are versioned (e.g., giving rise to the design version 504). Generally, for a software developer to modify code, the software version 504 must be 'checked out', downloaded to a workstation such as a PC, then 'checked in' once modification and/or testing is complete. Testing is generally accomplished through either local testing of checked-out code, or may also be performed by copying the design version 504 to a dedicated test server where testing can be defined, including defining the anticipated and/or specified runtime environment of the customer.

Testing may be important to the Company for a number of reasons, but in this case two are noteworthy. First, the Company has a basic need to provide functioning software meeting quality controls standards for its customers. Second, in the present example, correct operation of AutoOS and its sub-systems are critical for safety reasons. Because the software controls the motion of large physical objects such as cars and forklifts, it is important that the software operates as intended so it does not cause harm. For example, AutoOS may have to achieve a high-performance rate and a low error rate to be considered safe for consumer use and/or deployment on public roads and freeways.

The Company stores tests for their software in a data repository on a test server (e.g., the test database 750 of the test storage server 700). Tests may also be versioned (e.g., a test version 708), with each test comprised of individual test scripts 707A through 707N. For example, one set of tests may primarily be related to direct interactions with the operating system kernel, for example where a test script 707 opens a communication port. Other tests may be related to more complex simulations, for example running a driving simulation (e.g., to see how the AutoOS software responds in thousands of different driving conditions), generating a simulation performance check (e.g., time until a road hazard or obstruction is identified), etc.

As important as testing is for the Company, the Company and its software developers are experiencing a number of challenges. First, to run a series of tests, a software developer must first define a runtime environment, download the design files (e.g., download the design fileset 502 to to a test server or a computing device 100), and then manually execute each test script while making sure to reset the testing environment after each test. For example, where AutoOS opens a communication port as a result of test script 707A, the software developer may have to remember to close the port to 'reset' the testing environment. In another example, testing the efficiency of a machine learning process that is intended to learn to recognize obstructions (e.g., a deer in a roadway) may require the process is reset before looking for a different type of obstruction (e.g., a pothole on the freeway). Even where a test script 707 defines an automatic reset of the testing environment, it may be difficult or impossible to completely restore the runtime environment, or there may be errors in the test script 707 that does not sufficiently restore the runtime environment.

Manual resets are sometimes forgotten or incorrectly administered, leading the next test to fail, resulting in lost time to track down the apparent bug. What may be of more concern is that a failed manual reset may result in a subsequent test passing when it should not have. For example, several tests for recognizing an obstruction have returned a "pass" when a larger machine learning dataset was available then should have been at the time the test was run. This extra 'training' available to a machine learning process occurred because the software developer forgot to reset the machine learning filesystem and artificial neural network. In such cases, for example, tests and testing procedure may be interfering with additional tests.

In the present example, this process has been time consuming for the company to run serialized tests with relatively high false positive and false negative results. This process permits only one or a few software developers to be testing AutoOS at a given time, utilizes all computing resources of the test server for each testing environment (regardless of the computational demands of the testing at any given moment), and generally has lead to uncertainty in the accuracy of the test results, sometimes forcing re-tests in order to increase confidence in first test results. Sometimes failed tests have also difficult to re-create when it comes time to solve the error, for example requiring a different software developer to re-build the runtime environment and re-run the test to observe the error in detail. Such low efficiency has resulted in high cost, both in terms of human resources and computing resources.

In this example, the Company also has another concern. A competitor of the Company recently experienced an accident with one of its autonomous vehicles that resulted in a pedestrian injury. The competitor is now in a personal injury lawsuit and is being investigated by a regulatory agency. The accident looks like it might have been avoided through more rigorous testing. To be proactive, the Company decides to create policies that document the testing of all software including AutoOS. Part of the policies include retention of all testing data, and require that any bugs or errors should be reproducible.

Partially as a result of one or more of the foregoing challenges, AutoCar implements an embodiment of the Component Testing and Certification Network 150. An orchestration server 200, a workspace assembly server 300, and a dissociated test server 400 are deployed on computing hardware located in a data center. The test orchestration server 200 can receive instructions from software developers of the Company to execute a series of tests on a software design such as AutoOS and/or its components. The instructions are in the form of a request either submitted through the workstation of the software developer as command line instructions or instructions generated through selections made within a graphical user interface submitted on the computing device 100. The test orchestration server 200 has multi-tenant capability such that several users (e.g., a user 102A and a user 102B) can submit jobs that can run at the same time (e.g., initiated by a testing request 105A and a testing request 105B).

Under the new deployment, software developers test AutoOS and its components in easily specified and reproducible runtime environments with efficiently allocated resources. A software developer generates a testing request 105 which is submitted to the test orchestration server 200. For example, the testing request 105 specifies the design fileset 502 of AutoOS to be tested (AutoOS version 2.4061), a test fileset 506 defining a series of simulated driving events for AutoOS to respond to, and runtime environment components (e.g., Ubuntu version 1.5 with hardware drivers loaded) as may be used by a car manufacturer. For example, the test fileset 506 may be simulated testing of recognition and response with respect to various road signs and traffic signals, with each of three thousand instances of the test script 407 testing three thousand different driving and/or traffic scenarios (e.g., "SignalTest version 1.0032"). For example, one instance of the test script 407A may test approach of a stop sign at 30 miles per hour in clear conditions, whereas another test script 407B may test approach of a stop sign at 40 miles per hour in foggy conditions. The test orchestration server 200 instructs creation of a workspace master 310 by querying relevant databases and filesystems (e.g., the design server 500, the root filesystem server 600, and/or the test storage server 700), as shown and described herein. The workspace master 310 may include a substrate filesystem 604 because the design fileset 502 may, upon recognition of a road sign or signal, store one or more images of the recognized object and/or an associated log files of a time series, within a filesystem for record keeping and/or future training data purposes.

The test orchestration server 200 may fractionate the test fileset 706 into each discrete test script 407, as shown and described herein. After checking for available computing resources, the test orchestration server 200 may then issue instructions to 'spin up' (start) a discrete environment on the dissociated test server 400 for each of the three thousand instances of the test script 407 of the test fileset 706 as computing resources become available (resources from the computing resources pool 499).

Specifically, in the present example, a hypervisor (e.g., OpenVZ, LXC) is assigned a test script 707 (which may be cloned to result in a test script 407) and the hypervisor then instructed to request generation of a container as an implementation of the discrete environment 412 (e.g., the container 413 such as an OpenVZ container instance, an LXC container instance). The test orchestration server 200 may instruct cleanup of left-over cruft from previous runs on the hypervisor, if any. Each container 413 is spun up upon request and for the purpose of a single test, resulting in a pristine environment isolated from other tests or testing. In the present example, because the testing is a "simulation type" testing, a test template may allocate computing resources generally deemed sufficient for a simulation. As just one example, the template may require 16 Gigs of RAM (e.g., the memory allocation 493) and 4 dedicated processing cores (e.g., the processing power allocation 491). Note that in the present example, the discrete environment 412 is a container (e.g., the container 413) created through utilization of a virtual computer providing the kernel. The container 413 includes a substrate filesystem 604 and binding of mounts containing the design fileset 502.

The workspace master 310 may be cloned into each discrete environment 412 (e.g., three thousand for SignalTest version 1.0032). The cloning may be a copy-on-write data structure permitting references back to the workspace master 310, and therefore permitting each discrete environment to function as if having a separate copy, but without the overhead in bandwidth, storage, and memory that may otherwise be required to copy AutoOS (which in this example is over 300 Gigabytes in size) into three thousand different test servers. Rather, the clones of AutoOS only define referential data, which is a few megabytes. The Company sees typical 'spin up' speeds about less than one second per instance of the container 413. The containers 413 each execute in parallel as the computing resources become available, reducing testing time to a fraction of the time required for serialized manual testing.

In the present example, as each test script 407 is executed by remote instruction of the test orchestration server 200, results are returned and stored in the result capture database 250. For example, the test script 407J may be a simulated test for AutoOS to attempt to identify a school zone and instruct slowing of a piloted vehicle, where the result data 252J generated is (i) storage of a log file with data describing the exact time of decision, (ii) the applied deceleration curve, and (iii) reallocation of computing power to bolster recognition of human shapes outside of the immediate driving path. A 'pass' may occur where the correct deceleration function is selected that (a) results in slowing prior to entry of the school zone, and (b) demonstrates additional slowing upon recognition of human forms in the periphery of the vehicle once within the school zone. In the present example, each instance of the result data 252 is stored in a key-value store and published with a session identifier which the user 102 may subscribe to according to a pub-sub model. Following execution of each test scripts 407 of the test fileset 706, a summary report (e.g., the test report 258) is generated and returned to the software developer who requested the test.

In the present example, because the test was run on AutoOS, a record of the testing (e.g., the test record 851) is created within a certification server 800. AutoOS version 2.4061 and SignalTest v1.0032 can be designated for retention such that the testing in the test record is later reproducible if necessary. The test record 851 may include, for example, the test version 708, the runtime environment data 823, the substrate filesystem 604 utilized for testing, the result set 251, the test report 258, and/or references the locations and/or address of any data retained from the test (e.g., the stored instance of the discrete environment) 412.

In the present example, while almost all tests passed, a few failed. For example, AutoOS failed to recognize a stop sign with minor graffiti on it (e.g., resulting in a test failure 254). For the Company, this is a serious error in their autonomous vehicle operating system requiring immediate attention. Because the test failed, the discrete environment 412 running the test may be retained (along with the workspace clone 410, the substrate filesystem 604, and/or any other data on which the discrete environment 412 references and/or depends).

Computing resources of the discrete environments used to run the test, other than any retained environments, are returned to the computing resources pool 499 of the dissociated test server 400, immediately freeing up and efficiently reallocating the computing resources for other tests that may be requested by tens or hundreds of the Company's other software developers active at any given time.

By deploying one or more of the present embodiments, the Company is able to efficiently test their AutoOS software. The Company has reduced the use of human and computer resources, and eliminated manual serialization of testing. The Company has also eliminate the need for many human actions prone to error, and reduced time chasing down false positives and negatives streaming from incorrect testing results. Finally, the isolation testing partially effected by the dissociated test server 400 may help to more rapidly identify failed tests, increase certainty as to why those test failed, and present and/or preserve the data required to resolve the failure. As a result, the company has saved money, time, and increased revenue through faster production cycles.

In addition, the company can also use the deployment to recreate testing and testing failures on AutoOS for further study and/or to certify that re-creation of a testing is possible for AutoOS. For example, upon hearing of a test failure related to the stop sign from a colleague, a first software developer (e.g., the user 102A) logged into a certification server 800, selected the associated test record 851 (e.g., originally generated by the user 102B), and generated a test validation request 813 to re-create the test. As shown and described above and throughout the various embodiments, a new testing request 105 may be generated to re-build the workspace master 310 and re-run all three thousand tests of SignalTest v1.0032 on AutoOS version 2.4061 in the same runtime environment.

In addition, a software developer may easily determine if a software version (e.g., AutoOS version 2.4061) has undergone isolation testing by submitting a validation request 813. The certification server 800 may extract a test record 851 for each design file 503 of the design fileset 502, including any dependencies. For example, where AutoOS version 2.4061 depends on a software filter version 1.5601 for pre-processing LIDAR data from sensors of the autonomous vehicle, the validation request 813 may include a request to check all components of AutoOS version 2.4061 for completed isolation testing as well. At a macro level, the Company may be easily be able to determine that all software in AutoOS has undergone isolation testing prior to a production release that goes to the Company's customers for use.

As a result of the validation capabilities of one or more of the present embodiments, the Company has increased certainty as to which designs are thoroughly tested. The Company can re-create both passes and failures of AutoOS, help the company more rapidly improve AutoOS and potentially avoid undeserved liability with certifiable proof of rigorous testing. Due to better quality assurance, auditability, and certifiable testing processes, Company may have an increased competitive advantage in licensing their software to large car manufacturers or in obtaining valuable government contracts. Most importantly, the Company now offers safer, more thoroughly tested software.

Although the present embodiments have been described with reference to specific example embodiments, it will be evident that various modifications and changes may be made to these embodiments without departing from the broader spirit and scope of the various embodiments. For example, the various devices, engines, agent, routines, subroutines, and modules described herein may be enabled and operated using hardware circuitry (e.g., CMOS based logic circuitry), firmware, software, or any combination of hardware, firmware, and software (e.g., embodied in a non-transitory machine-readable medium). For example, the various electrical structure and methods may be embodied using transistors, logic gates, and electrical circuits (e.g., application specific integrated circuitry (ASIC) and/or Digital Signal Processor (DSP) circuitry).

In addition, it will be appreciated that the various operations, processes, and methods disclosed herein may be embodied in a non-transitory machine-readable medium and/or a machine-accessible medium compatible with a data processing system (e.g., the computing device 100, the test orchestration server 200, the workspace assembly server 300, the dissociated test server 400, the design server 500, the root filesystem server 600, the test storage server 700, the certification server 800, the network node of the blockchain network). Accordingly, the specification and drawings are to be regarded in an illustrative rather than a restrictive sense.

The structures in the figures such as the engines, routines, subroutines, and modules may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the preceding disclosure.

Embodiments of the invention are discussed above with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures.

From reading the present disclosure, other variations and modifications will be apparent to persons skilled in the art. Such variations and modifications may involve equivalent and other features which are already known in the art, and which may be used instead of or in addition to features already described herein.

Although claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any claim and whether or not it mitigates any or all of the same technical problems.

Features which are described in the context of separate embodiments may also be provided in combination in a single embodiment. Conversely, various features which are, for brevity, described in the context of a single embodiment, may also be provided separately or in any suitable subcombination. The applicants hereby give notice that new claims may be formulated to such features and/or combinations of such features during the prosecution of the present application or of any further application derived therefrom.

References to "one embodiment," "an embodiment," "example embodiment," "various embodiments," "one or more embodiments," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least one or more embodiments of the invention" includes the stated particular feature, structure, or characteristic.

The enumerated listing of items does not imply that any or all of the items are mutually exclusive, unless expressly specified otherwise.

It is understood that the use of a specific component, device and/or parameter names are for example only and not meant to imply any limitations on the invention. The invention may thus be implemented with different nomenclature and/or terminology utilized to describe the mechanisms, units, structures, components, devices, parameters and/or elements herein, without limitation. Each term utilized herein is to be given its broadest interpretation given the context in which that term is utilized.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

A "computer", "server", and/or "computing device" may refer to one or more apparatus and/or one or more systems that are capable of accepting a structured input, processing the structured input according to prescribed rules, and producing results of the processing as output. Examples of a computer, a server, and/or a computing device may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; a smartphone, application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, one or more embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java®, Jini™, C, C#, C++, Smalltalk, Perl, UNIX Shell, Visual Basic or Visual Basic Script, Virtual Reality Markup Language (VRML), ColdFusion®, Go, Swift, or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "memory" or "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module", "engine", and "system" (and "routine", "subroutine", or "procedure" when identified as or understood to be stored as computer readable instructions) Furthermore, aspects of the present invention may take the form of a computer program product embodied in one or more computer readable medium(s) having computer readable program code embodied thereon.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The term "processor" may refer to any device or portion of a device that processes electronic data from registers and/or memory to transform that electronic data into other electronic data that may be stored in registers and/or memory. A "computing platform" may comprise one or more processors.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of implementing the certification network 150 according to the present invention will be apparent to those skilled in the art. Various aspects of the invention have been described above by way of illustration, and the specific embodiments disclosed are not intended to limit the invention to the particular forms disclosed. The particular implementation of the loyalty rewards programs may vary depending upon the particular context or application. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

We claim:

1. A method for software and computing hardware design testing, the method comprising:
   selecting a test fileset comprising one or more test scripts;
   selecting a filesystem root of a substrate filesystem to be operated on by at least one of the one or more test scripts;
   initiating a new instance of an operation filesystem to operate from;
   cloning the substrate filesystem to be operated on to generate a substrate filesystem clone;
   copying at least one of a software application, a script, a computer hardware design, and a circuit design to be tested into the operation filesystem to define a workspace data;
   defining a workspace master;
   initiating a discrete environment that is at least one of a computing container and a virtual computer;
   cloning the workspace master to generate a workspace clone;
   mounting the workspace clone to the discrete environment and associating the workspace clone with the substrate filesystem clone; and
   executing a test script from the one or more test scripts to write to the workspace clone.

2. The method of claim 1, further comprising:
   assigning the discrete environment a processing power allocation and a memory allocation from a computing resources pool;
   evaluating a result data that is output from execution of the test script;
   determining a test passage;
   executing a tear-down instruction for the discrete environment;
   returning to the computing resources pool at least one of the processing power allocation and the memory allocation; and
   designating the substrate filesystem clone for deletion.

3. The method of claim 2, further comprising:
   evaluating the result data that is output from execution of the test script;
   determining a test failure; and
   designating the substrate filesystem and the substrate filesystem clone for storage retention in a computer memory.

4. The method of claim 3, further comprising:
   generating a test report comprising the result data; and
   returning the test report to a computing device of a user.

5. The method of claim 4, further comprising:
   initiating a second instance of the discrete environment;
   re-assigning at least a portion of at least one of the processing power allocation and the memory allocation from the computing resources pool to the second instance of the discrete environment;
   cloning the workspace master to generate a second instance of the workspace clone;
   cloning the substrate filesystem to generate a second instance of the substrate filesystem clone;
   mounting the second instance of the workspace clone to the second instance of the discrete environment and associating the second instance of the substrate filesystem clone to the workspace clone;
   selecting, from the one or more test scripts of the test fileset copied into the workspace data and cloned into the second instance of the workspace clone, a second instance of the test script that is different from a first instance of the test script; and
   executing the second instance of the test script.

6. The method of claim 5, further comprising:
   authenticating at least one of the user and the computing device of the user;
   initiating a test session and assigning a session identifier to the test session;
   verifying a unique identifier of the user is associated with a read permission of at least one of the software application, the script, the computer hardware design, and the circuit design, the test fileset, the substrate filesystem, and a design component of a design dependency graph associated with the at least one of the software application, the script, the computer hardware design, and the circuit design;
   assigning the session identifier to at least one of the result data and the test report; and
   returning at least one of the result data and the test report to the computing device of the user.

7. The method of claim 6, further comprising:
   copying the at least one of the software application, the script, the computer hardware design, and the circuit design into the operation filesystem;
   read-only protecting the workspace data of the workspace master;
   storing a runtime environment data of a runtime environment of the discrete environment;

defining a database relation associating at least one of the software application, the script, the computer hardware design, and the circuit design and the runtime environment data;
defining a database relation associating the result data and at least one of the software application, the script, the computer hardware design, and the circuit design; and
defining a database relation associating the test report and at least one of the software application, the script, the computer hardware design, and the circuit design.

8. The method of claim 2, further comprising:
modifying the substrate filesystem clone through one or more computer executable instructions of the test script.

9. A method for efficient testing with a test fileset, comprising:
selecting a filesystem root of a substrate filesystem to be operated on by at least one of one or more test scripts of the test fileset;
initiating a new instance of an operation filesystem to operate from;
cloning the substrate filesystem to be operated on to generate a substrate filesystem clone;
copying at least one of a software application, a script, a computer hardware design, and a circuit design to be tested into the operation filesystem to define a workspace data;
defining a workspace master;
initiating a discrete environment that is at least one of a computing container and a virtual computer;
assigning the discrete environment a processing power allocation and a memory allocation from a computing resources pool;
cloning the workspace master to generate a workspace clone;
mounting the workspace clone to the discrete environment and associating the workspace clone with the substrate filesystem clone;
extracting a test script from the test fileset;
executing the test script within the workspace clone; and
returning to the computing resources pool at least one of the processing power allocation and the memory allocation.

10. The method of claim 9, further comprising:
executing a tear-down instruction for the discrete environment;
initiating a second instance of the discrete environment;
re-assigning at least a portion of at least one of the processing power allocation and the memory allocation from the computing resources pool to the second instance of the discrete environment; and
cloning the workspace master to generate a second instance of the workspace clone.

11. The method of claim 10, further comprising:
receiving a testing request comprising:
    a selection of at least one of the software application, the script, the computer hardware design, and the circuit design, and
    a selection of a test version of the test fileset, the test fileset comprising one or more test scripts;
selecting a filesystem root of a substrate filesystem to be operated on by at least one of the one or more test scripts;
cloning the substrate filesystem to be operated on to generate a substrate filesystem clone;
mounting the workspace clone to the discrete environment and associating the workspace clone with the substrate filesystem clone;
storing the test script in a test queue;
extracting the test script from the test queue;
evaluating a result data;
determining the test script is fully executed within the workspace clone;
designating the substrate filesystem clone for deletion;
extracting a second test script from the test fileset;
storing the second test script in the test queue;
selecting from the test queue, from the one or more test scripts of the test fileset copied into the workspace data and cloned into the second instance of the workspace clone, a second instance of the test script that is different from a first instance of the test script; and
executing the second instance of the test script.

12. The method of claim 11, further comprising:
modifying the substrate filesystem clone through one or more computer executable instructions of the test script.

13. The method of claim 12, further comprising:
generating a test report comprising the result data; and
returning the test report to a computing device of a user.

14. The method of claim 13, further comprising:
evaluating the result data that us output from execution of the test script;
determining a test failure;
assigning a unique identifier to the substrate filesystem clone; and
designating the substrate filesystem and the substrate filesystem clone for storage retention in a computer memory.

15. The method of claim 14, further comprising:
authenticating at least one of the user and the computing device of the user;
initiating a test session and assigning a session identifier to the test session;
verifying the unique identifier of the user is associated with a read permission of at least one of the software application, the script, the computer hardware design, and the circuit design, the test fileset, the substrate filesystem, and a design component of a design dependency graph associated with the at least one of the software application, the script, the computer hardware design, and the circuit design;
assigning the session identifier to at least one of the result data and the test report;
returning at least one of the result data and the test report to the computing device of the user;
storing a runtime environment data of a runtime environment of the discrete environment;
defining a database relation associating the runtime environment data and at least one of the software application, the script, the computer hardware design, and the circuit design;
defining a database relation associating the result data and at least one of the software application, the script, the computer hardware design, and the circuit design; and
defining a database relation associating the test report and at least one of the software application, the script, the computer hardware design, and the circuit design.

16. A system for testing computing hardware designs and software, the system comprising:
a test orchestration server, comprising:
    a processor of the test orchestration server,
    a memory of the test orchestration server, a test processing agent comprising computer readable instructions that when executed on the processor of the test orchestration server:
  select a filesystem root of a substrate filesystem root to be operated on by at least one of one or more test scripts included in a test fileset, and
  issue an assembly instruction to assemble a workspace master comprising at least one of a software application, a script, a computer hardware design, and a circuit design to be tested,
a test fractionation routine comprising computer readable instructions that when executed on the processor of the test orchestration server:
  extract a test script from the test fileset,
an environment manager comprising computer readable instructions that when executed on the processor of the test orchestration server:
  issue an environment initiation instruction to initiate a discrete environment that is at least one of a computing container and a virtual computer,
a cloning engine comprising computer readable instructions that when executed on the processor of the test orchestration server issues a cloning instruction to:
  clone the substrate filesystem to be operated on to generate a substrate filesystem clone,
  clone the workspace master to generate a workspace clone, and
  mount the workspace clone to the discrete environment and associate the workspace clone with the substrate filesystem clone,
a test isolation engine comprising computer readable instructions that when executed on the processor of the test orchestration server:
  issue an environment execution instruction to execute the test script within the discrete environment, and
a network.

17. The system of the claim 16, wherein:
the environment manager further comprising computer readable instructions that when executed on the processor of the test orchestration server:
  issue a resource allocation instruction that assigns the discrete environment a processing power allocation and a memory allocation from a computing resources pool; and
  issue a tear-down instruction for the discrete environment upon determination of a test passage, and
the system further comprising a dissociated test server, comprising:
  a processor of the dissociated test server,
  a memory of the dissociated test server,
  a first set of computer readable instructions that when executed on the processor of the dissociated test server initiate a new instance of an operation filesystem to operate from,
  a second set of computer readable instructions that when executed on the processor of the dissociated test server executes at least one of the environment initiation instruction, the resource allocation instruction, the cloning instruction, and the tear-down instruction, and
  a third set of computer readable instructions that when executed on the processor of the dissociated test server:
    executes the test script;
    generates a result data; and
    transmits the result data to a result capture database, and
  a fourth set of computer readable instructions that when executed on the processor of the dissociated test server:
    returns to the computing resources pool at least one of the processing power allocation and the memory allocation upon tear-down of the discrete environment.

18. The system of the claim 17, further comprising:
a workspace assembly server, comprising:
  a processor of the workspace assembly server,
  a memory of the workspace assembly server,
  a master assembly engine comprising:
    a substrate filesystem retrieval subroutine comprising computer readable instructions that when executed on the processor of the workspace assembly server selects a filesystem root of a substrate filesystem to be operated on by at least one of the one or more test scripts; and
    a design retrieval subroutine comprising computer readable instructions that when executed on the processor of the workspace assembly server copy the test fileset into the operation filesystem,
      wherein together the test fileset copied into the operation filesystem and the at least one of the software application, the script, the computer hardware design, and the circuit design copies into the operation filesystem defining a workspace data, and
  a workspace master procedure comprising computer readable instructions that when executed on the processor of the workspace assembly server read-only protects the workspace data to define the workspace master,
  wherein the cloning engine further comprising computer readable instructions that when executed on the processor of the test orchestration server:
    clone the substrate filesystem to be operated on to generate a substrate filesystem clone, and
    mount the workspace clone to the discrete environment and associate the workspace clone with the substrate filesystem clone,
      wherein a fifth set of computer readable instructions of the dissociated test server when executed on the processor of the dissociated test server modify the substrate filesystem clone through execution of the test script.

19. The system of the claim 18, wherein:
the test orchestration server further comprising:
  an authentication system comprising computer readable instructions that when executed on the processor of the test orchestration server authenticates at least one of a user generating a testing request and a computing device of the user,
  an access control system comprising computer readable instructions stored in the memory of the test orchestration server that when executed on the processor of the test orchestration server:
    verify a unique identifier of the user is associated with a read permission of at least one of the software application, the script, the computer hardware design, the circuit design, the test fileset, the substrate filesystem, and a design component of a design dependency graph associated with the at least one of the software application, the script, the computer hardware design, the circuit design, a session tracking routine comprising computer readable instructions that when executed on the processor of the test orchestration server:
  initiate a test session and assign a session identifier to the test session; and
  assign the session identifier to at least one of the result data and a test report,
a report generation module comprising computer readable instructions that when executed on the processor of the test orchestration server:
  generating the test report comprising the result data; and
  return at least one of the result data and the test report to the computing device of the user, and
a test evaluation routine comprising computer readable instructions that when executed on the processor of the test orchestration server:
  evaluate the result data;
  determine a test failure; and
  designate the substrate filesystem and the substrate filesystem clone for storage retention in a computer memory.

20. The system of the claim 19, further comprising:
the computing device of the user, comprising:
  a processor of the computing device,
  a memory of the computing device,
  a development application comprising computer readable instructions that when executed on the processor of the computing device at least one of displays a version of at least one of the software application, the script, the computer hardware design, the circuit design, navigates the design dependency graph, and generates the testing request,
a design server, comprising:
  a database management application of the design server comprising computer readable instructions that when executed on the processor of the design server store the version of the at least one of the software application, the script, the computer hardware design, the circuit design within the design dependency graph,
a root filesystem server, comprising:
  a processor of the root filesystem server,
  a memory of the root filesystem server,
  a filesystem management application, and
  at least one filesystem comprising the substrate filesystem, and
a test storage server, comprising:
  a processor of the test storage server,
  a memory of the test storage server,
  a database management application of the test storage server, and
  a design database comprising at least one of the software application, the script, the computer hardware design, the circuit design, wherein at least one of the software application, the script, the computer hardware design, the circuit design optionally stores a component in the design dependency graph.

* * * * *